United States Patent [19]

Miyaji et al.

[11] Patent Number: 5,442,707
[45] Date of Patent: Aug. 15, 1995

[54] METHOD FOR GENERATING AND VERIFYING ELECTRONIC SIGNATURES AND PRIVACY COMMUNICATION USING ELLIPTIC CURVES

[75] Inventors: Atsuko Miyaji, Kawachinagano; Makoto Tatebayashi, Takarazuka, both of Japan

[73] Assignee: Matsushita Electric Industrial Co., Ltd., Osaka, Japan

[21] Appl. No.: 127,253

[22] Filed: Sep. 27, 1993

[30] Foreign Application Priority Data

Sep. 28, 1992 [JP] Japan .................. 4-257800
Apr. 9, 1993 [JP] Japan .................. 5-082978

[51] Int. Cl.⁶ .................. H04L 9/30; H04L 9/00
[52] U.S. Cl. .................. 380/30; 380/9; 380/10; 380/23; 380/25
[58] Field of Search .................. 380/9, 10, 20, 21, 23, 380/25, 30, 49; 348/6, 10, 12; 455/3.1, 5.1, 6.1, 6.3; 340/825.31, 825.34

[56] References Cited

U.S. PATENT DOCUMENTS

| | | | |
|---|---|---|---|
| 4,424,414 | 1/1984 | Hellman et al. | 380/30 |
| 4,495,082 | 1/1985 | Mita et al. | 252/194 |
| 4,668,103 | 5/1987 | Wilson | 380/30 |
| 4,956,683 | 9/1990 | Goss | 380/30 |
| 4,995,082 | 2/1991 | Schnorr | 380/23 |
| 5,010,573 | 4/1991 | Musyck et al. | 380/28 |
| 5,054,066 | 10/1991 | Riek et al. | 380/30 |
| 5,146,500 | 9/1992 | Maurer | 380/30 |
| 5,146,500 | 9/1992 | Maurer | 380/30 |
| 5,150,411 | 9/1992 | Maurer | 380/30 |
| 5,159,632 | 10/1992 | Crandall | 380/30 X |
| 5,159,632 | 10/1992 | Crandall | 380/28 |
| 5,159,633 | 10/1992 | Nakamura | 380/30 |
| 5,199,070 | 3/1993 | Matsuzaki et al. | 380/30 |
| 5,253,293 | 10/1993 | Shigemitsu et al. | 380/9 |
| 5,271,061 | 12/1993 | Crandall | 380/30 X |
| 5,272,755 | 12/1993 | Miyaji et al. | 380/30 |

FOREIGN PATENT DOCUMENTS

| | | | |
|---|---|---|---|
| 59-107658 | 6/1984 | Japan | H04K 1/00 |
| 63-52536 | 3/1988 | Japan | H04L 9/02 |
| 1119144 | 5/1989 | Japan | H04L 9/02 |
| 3505033 | 10/1991 | Japan | H04L 9/28 |

OTHER PUBLICATIONS

"Elliptic Curves ofer F Suitable for Cryptosystems", Abstract of Proceeding of Auscrypt '92, 1992, Atsuko Miyaji.

Primary Examiner—Bernarr E. Gregory
Attorney, Agent, or Firm—Price, Gess & Ubell

[57] ABSTRACT

The present invention discloses a method of generating and verifying electronic signatures for signed communication via a public digital network system by using an elliptic curve. The method is characterized by the step of supplying on the network system public data to each of users from a system provider, wherein an element P whose x-coordinate has 0 is chosen, a single parameter is chosen for the elliptic curve E over a finite field and its base point, and a prime number p is chosen such that one of $p=2^t+\alpha$ and $p=2^t-\alpha$ where $t$ is a positive integer and $\alpha$ is a positive integer. Accordingly, fewer parameters can represent the elliptic curve E, base point P, field of definition GF(p), and order of the base point P, and either the x-coordinate or y-coordinate of the base point P have a small value. As a result, the elliptic curve addition kP can be calculated faster for any k.

70 Claims, 8 Drawing Sheets

METHOD FOR GENERATING AND VERIFYING ELECTRONIC SIGNATURES AND PRIVACY COMMUNICATION USING ELLIPTIC CURVES

BACKGROUND OF THE INVENTION

1. Field of the Invention

The present invention relates to a cryptographic method which provides a high level of data security, and more particularly, to a cryptographic method with elliptic curves.

2. Description of Related Art

Generating and verifying electronic signatures is one of the methods to authenticate data transmitted via a public digital network system or to identify a data sender, and privacy communication is one of the methods to transmit data to an intended receiver alone without leakage to a third party. These methods often exploit a public key cryptosystem (PKC), where an enciphering key is open to the public while a deciphering key is kept in secret to each user, or a common key which plays a role of both the enciphering and deciphering keys is generated from the data exchanged between the concerned users and kept in secret. Given that it is relatively easy to manage these keys, PKC has now become an essential technique when a user wishes to communicate with more than one users in secret.

A level of security for PKC often depends on a problem of finding a discrete logarithm (DLP) on a finite field. Assume q is a power of a prime number, GF(q) is a finite field such that the order of GF(q) is divisible by a large prime number, and an element g is a base point, then the DLP is as follows: Given an element y of GF(q), find an integer x such that $y = g^x$, if such an integer x exists. Although it is easy to find y from g and x, it is a challenge to find x from y and g.

With referring to FIG. 1, how the DLP is applied to cryptography will be explained.

Here, let $q = p^1$ where p is a prime number, GF(q) = GF(p), g be a primitive root of GF(p), t be an arbitrary positive integer satisfying $1 \lesssim t \lesssim p-1$, u be an arbitrary positive integer satisfying $1 \lesssim u \lesssim p-1$, $\alpha$ be a residue of $g^t$ modulo $p(\alpha \equiv g^t \pmod{p})$, $\beta$ be a residue of $g^u$ modulo $p(\beta \equiv g^u \pmod{p})$, and k be a residue of g to the tu-th power($k \equiv g^{tu} \pmod{p}$), then it is easy to find $\alpha$ with g, p, and t, but it is quite difficult to find t using g, p and $\alpha$; likewise, it is easy to find $\beta$ with g, p and u, but it is quite difficult to find u using g, p and $\beta$.

Now in practice application where a user T wishes to send a message to a user U alone in secret, the users T and U respectively select t and u as secret keys to calculate $\alpha$ and $\beta$ with public data—p, GF(p), and g—which have been already provided to each user from the system provider. Then, they exchange $\alpha$ and $\beta$ to construct the common key k according to:

$$K \equiv g^{tu}$$
$$\equiv (g^t)^u \pmod{p} \equiv \alpha^u \pmod{p}$$
$$\equiv (g^u)^t \pmod{p} \equiv \beta^t \pmod{p}$$

More specifically, let p = 11, g = 2, t = 4, u = 8, then $\alpha = 5$ and $\beta = 3$, and thus we have k = 4.

These days, data are transmitted in the form of bit sequences $h_1, h_2, \ldots, h_i$ via digital public network system. This is because most of the systems employ digital hardware for enhancing transmission quality. Therefore, these bit sequences are enciphered and deciphered with k; these bit sequences may be enciphered by being multiplied by k, added to k, or ORed exclusively with k at the site of a data sender, and deciphered into the original data by an inverse process at the site of a receiver. Should a third party receive the enciphered data either intentionally or unintentionally, he will never be able to decipher them unless he finds $g^{tu}$. A level of security can be enhanced when the user replaces his secret key regularly, for example, every six months. In addition, users have less possibilities to select the secret keys of the same number as p becomes larger.

The privacy communication applied with DLP is not limited to a pair communication. For example, two other users, a user V and a user W, respectively withholding secret keys c and d, can join the above-described communication by calculating and exchanging the common keys—$g^{tu}$, $g^{tv}$, $g^{tw}$, $g^{uv}$, $g^{uw}$, and $g^{vw}$ with each other.

Also, the data may be transmitted through an intermediate user: the sender first transmits the enciphered data to the intermediate user by using a common key and then the intermediate user transmits them to the receiver with the acknowledgement of the receipt and transmission by using another common key. By doing so, the data transmission and receipt thereof can be documented.

The privacy communication is also employed in image data transmission, for example, in a subscription television service (STV) where deciphering equipments are provided to each subscriber, so that only those who have paid the charges can enjoy programs.

However, with every technical advancement in this field, the time required to solve DLP is getting shorter as is explained in "Cryptography: A Prime", Alan G. Konheim, John Wiely & Sons, Inc. To maintain the same level of security, the DLP on elliptic curves (EDLP), where an elliptic curve is used instead of the finite field, was proposed. The elliptic curve, such as one shown in FIG. 2, is an abelian manifold, or a projective algebraic curve with an irreducible and a non-singular genus 1 given by:

$$Y^2 = X^3 + a*X + b$$

where the characteristic of a finite field K is neither 2 nor 3, and a and b are elements of K.

Now, assume q is a power of a prime number, GF(q) is a finite field, E(GF(q)) is a group of elements of GF(q) on an elliptic curve E, and an element P of E(GF(q)) is a base point such that the order of P is divisible by a large prime number, then the EDLP is as follows: Given an element Q of E(GF(q)), find an integer x such that Q = xP, if such an integer x exists. Like the DLP, it is easy to find Q from x and P, but it is difficult to find x from Q and P.

A point $P_3'$, which is symmetric with respect to the x-axis to $P_3$, is assigned by $P_1 + P_2$ on the elliptic curve, and $P_3$ is an intersection of the elliptic curve and a straight line passing both $P_1$ and $P_2$; when $P_1 = P_2$, the straight line is a tangential line of the elliptic curve at $P_1$. Hence, Q, or x-fold multiple of P, is defined by consecutively adding P a number of x times. Thus, $$Q = xP$$
$$= P + \ldots + P,$$

where the number of terms in the sum is x.

Therefore, the data can be enciphered and deciphered by a specific computation with P. Given that P is a two dimensional value consisting of x and y coordinates, (x, y), the sender and receiver must notify which of coordinates is used for the communication in advance. Of course only one of them may be used invariably, or both of them may be used together.

No solution such that confers a sub-exponential algorithm has been proposed to EDLP yet. Therefore, the privacy communication as secure as the one depending on the DLP could be realized by constructing a relatively small finite field which requires less amount of data and hence simplifies computation for constructing EDLP. This is preferable because the computation is generally carried out in processor chip cards(integrated circuits), or so-called smart cards, provided with the network system, and a capacity thereof and the ability of associated CPU are limited.

For this reason, EDLP had been widely applied to PKC for the singed or privacy communication until MOV reduction was proposed in 1991. In the MOV reduction, EDLP having P∈E(GF(q)) as the base point is reduced to DLP over an extensive GF(q$^r$) when the order of P and q are relatively prime; particularly, DLP on the supersingular elliptic curve is reduced to an extensive at most GF(q$^6$) of GF(q). [For further information, see "Reducing Elliptic Curve Logarithm to Logarithm in a Finite Field", A. Menezes, S. A. Vanstone and T. Okamoto, STOC 91.] As a result, EDLP constructed even with a supersingular elliptic curve of 97-bit long is no longer as secure as it had been thought.

However, against the attack by the MOV reduction, a variety of methods have been proposed for constructing irreducible EDLP by determining an adequate elliptic curve. Some of these methods are disclosed in "Non-supersingular Elliptic Curves for Public Key Cryptosystems", T. Beth and F. Schaefer, Eurocrypt '91, 1991, and U.S. patent application Ser. Nos. 07/904,944 filed Jun. 26, 1992, and 08/048,478, filed Apr. 16, 1993, of Miyaji et al., now U.S. Pat. Nos. 5,272,755 and 5,351,297 respectively.

Thanks to these newly proposed methods, irreducible EDLP with a small finite field is available to cryptography now. In the following, three typical applications of such cryptography will be explained.

First Application

In the first application, Shnorr's method for generating and verifying electronic signatures in a data exchange system, in which a user T transmits a plaintext message m in the form of binary bits to a user U with his electronic signature, will be explained with referring to FIG. 3.

To begin with, an elliptic curve defined over GF(p) and given by:

$$Y^2 = X^3 + a*X + b$$

is chosen in any of the aforementioned methods, so that the MOV reduction will not be applied.

Now, assume p is a prime number of 97 or more bits long, E(GF(p)) is a group of elements of GF(p), F is an element whose order is divisible by a large prime number, and o(F) is an order of F, then $$o(F) = d*j$$

where d is a maximum prime factor of o(F) of 97-bit long and j is an integer, and set $$P = j*F$$

Assume P is a base point on the elliptic curve, then the order of P has exactly d. Further, assume h is a one-way hash function to a direct product of GF(p) and a ring of integers defined as $\{0, 1, \ldots, 2^t-1\}$, then P, E, GF(p) and the hash function h are notified to each user as the public data by the system provider. The hash function is a function such that makes it difficult to find an input M' of h(M)=h(M') for an input M.

The user T selects an integer $s_t$ as a secret key and calculates a public key $L_t$ according to a rule below, and notifies it to a receiver user U, or to all the other users prior to the data transmission. As was explained in EDLP, $s_t$ is not easily found with $L_t$ and P.

$$L_t = -s_t*P \text{ where } 0 < s_t < o(P).$$

Subsequently, the user T secretly generates a random number k to calculate an element R consists of (x(R), y(R)):

$$R = k*P \quad (1)$$

Having prepared $s_t$, k, h and x(R), the user T generates electronic signatures e and s according to:

$$e = h(x(R), m)$$

$$s = k + s_t*e \ (mod \ o(P)) \quad (2)$$

Once e and s are generated, the user T transmits them together with the message m to the user U. Upon the receipt of the singed message, the user U calculates $R_1$ with the user T's public key $L_t$ according to:

$$R_1 = s*P + e*L_t = (x(R_1), y(R_1))$$

Once $R_1$ is calculated, the user U checks whether $$e = h(x(R_1), m)$$

because if the signature is of the user T's, $R_1$ and R should coincide.

Thus, $$\begin{aligned} R_1 &= s*P + e*L_t \\ &= (k + s_t * e) * P + e * (-s_t * P) \\ &= k*P \\ &= R \end{aligned}$$

hence, $$h(x(R_1), m) = h(x(R), m) = e$$

In this way, the user U can verify the signature and identify the user T as the sender of the data while receiving the original message m.

Now, let the amount of data used in the above-described computation be evaluated. The public data—the prime number p, the parameter a of the elliptic curve, the base point P, and the order d of P—are altogether referred to as a system key, and the total amount thereof is calculated by adding the bits of these elements. The amount of public key $L_t$ is calculated by adding two coordinates of $L_t(x(L_t), y(L_t))$, and the public key $L_t$ is fixed by:

$$L_t = s_t P,$$

where $s_t$ is an integer satisfying $1 \lesssim s_t \lesssim d-1$

The total amount of computation in generating the signature is calculated by adding computation amount used in Equations (1)(i.e. 1546m) and (2)(i.e. 1m), and subsequently multiplying the adding result by m(97), which equals to the amount of one multiplication by a finite field of 97-bit long. The total amount of computation in verifying the signature is calculated by adding the bits used in calculating $R_1$(i.e. 1823m) and its precomputation(i.e. 16m), and subsequently multiplying the adding result by m(97).

Thus, the amount of data is:
the system key: 485 bits
the secret key $s_t$: 97 bits
the public key $L_t$: 194 bits (97×2)
Then, the amount of computation is:
generating the signature: 1565m(97) (1564m+1m)
verifying the signature: 1839m(97) (1823m+16m)

In a typical smart card, the sum of system key and secret key $s_t$, 485 bits+97 bits=582 bits, are stored and the computation comparable to 1565m(97) is carried out.

With respect to the public key $L_t$ consisting of ($x(L_t)$, $y(L_t)$), the amount of data is inevitably multiplied double-fold compared with the finite field, and each user needs to withhold $L_t$ of his own. Therefore, total data size of all the users becomes large. On the other hand, it is more preferable for an application with the smart card to decrease the data amount thereof hence the overall data amount for further speeding up the computation.

Second Application

Accordingly, in the second application, a method to decrease the data amount of the public key $L_t$ will be explained with referring to FIG. 4.

In this application, $x(L_t)$ and only a 1-bit $c(L_t)$ which recover $y(L_t)$, in the same way, $x(P)$ and 1-bit of $y(P)$ of the base point P are used as public data with the following algorithm:

$$(x^3+ax+b)^{P-1}=1$$

and when P=4*s+3, $$y^4 = (x^3 + ax + b)^2 = (X^3 + ax + b)^{4s+2} * (x^2 + ax + b)^2$$

thus, $$y=\pm(x^3+ax+b)^{s+1},$$

therefore, $$y=(x^3+ax+b)^{s+1}$$

where $C(L_t)=1$, and $$y=-(x^3+ax+b)^{s+1}$$

where $C(L_t)=-1$.

Note that multiplication must be repeated to recover $L_t$ with $c(L_t)$ in this algorithm.

Now let the amount of data and computation be evaluated in the same manner as the first conventional application. However, in this application, the public data—the prime number p, the parameters a and b of the elliptic curve, the base point P consisting of (x(P), c(P)), and the order d of P—are altogether referred to as the system key, and the amount thereof is calculated in the same way as the first conventional application. $x(L_t)$ and $c(L_t)$ are referred to as the public key fixed by:

$$L_t = -s_t P$$

where $s_t$ is an integer satisfying $1 \lesssim s_t \lesssim d-1$, and the amount thereof is calculated in the same way as the first conventional application.

The amount of computation in generating the signature is calculated by adding the bits used in Equations (1)(i.e. 1565m) and (2)(i.e. 1m), and the calculation for recovering y(P) with C(P)(i.e. 148m), and by subsequently multiplying the adding results by m(97). The amount of computation in verifying the signature is calculated by adding the bits used in calculating $R_1$(i.e. 1823m) and its precomputation (i.e. 16m), and in deciphering y(P) with x(P) and C(P), and $y(L_t)$ with $C(L_t)$(i.e. 297m), and by subsequently multiplying the adding results by m(97).

Consequently, the amount of data is:
the system key: 486 bits
the secret key $s_t$: 97 bits
the public key $L_t$: 98 (97 +1) bits
Thus, the amount of computation is:
generating the signature: 1714m(97) (1565m+1m+148m)
verifying the signature: 2136m(97) (1823m+16m+297m)

Accordingly, 486+97=583 bits are stored in the smart card, and the computation comparable to 1714m(97) is carried out. Compared with the first application, the amount of the public key $L_t$ is decreased almost by half; however, the amount of the computation increases noticeably because multiplication by $x(L_t)$ and $c(L_t)$ must be repeated to recover $y(L_t)$, which results in adverse effects on computation speed.

In addition, note that the computation speed can not be enhanced by simply choosing an elliptic curve having a small field of definition; for one elliptic curve addition involves approximately twelve multiplications.

Third Application

Accordingly, in the third application, a method to increase the computation speed from "CM-curves with Good Cryptographic properties", Crypto '91, 1991 will be explained with referring to FIG. 5.

In the first place, a prospective elliptic curve is chosen.

Let $E_1$ and $E_2$ be anomalous elliptic curves defined over GF(2) and given by:

$$E_1: y^2+xy=x^3+x^2+1$$

$$E_2: y^2+xy=x^3+1$$

Let $E(GF(2^m))$ be a group consisting of the elements of $GF(2^m)$ on each elliptic curve, then, $$E_1(GF(2^m))=\{x, y \in GF(2^m) | y^2+xy=x^3+x^2+1\} U\{\infty\}$$

$$E_2(GF(2^m))=\{x, y \in GF(2^m) | y^2+xy=x^3+1\} U\{\infty\}$$

where $\infty$ is an infinite point.

Next, a suitable extension degree m is determined. It is known that EDLP is easily solved unless the order of the base point P has a large prime factor. Therefore, a necessary and sufficient condition for the base point P is that the number of the elements of GF(q), #$E_t$(GF(q))

where i=1 and 2, has a large prime factor. Thus, m satisfying this condition is found by factorizing #$E_i$GF(q). Now assume we have m=101, #$E_1$(GF($2^m$))=2 * $p_1$, and m=131, #$E_2$(GF($2^m$))=4 * $p_2$ where $p_1$ and $p_2$ are prime numbers. With these m's, the finite field embedded by the MOV reduction becomes sufficiently large.

The foregoing leads to the conclusion that a high security level of the privacy communication is established when it is dependent on EDLP having $E_1$(GF($2^{101}$)) with the base point P whose order has exactly $p_1$ on the field of definition, or EDLP having $E_2$(GF($2^{131}$)) with the base point P whose order has exactly $p_2$ on the field of definition.

Now, in the anomalous elliptic curves, $[2]=T-T^2$, where T is a map of E: $T(x,y)=(x^2, y^2)((x, y)\epsilon E)$. Thus, $4=2(T-T^2)=-T^3-T^2$,
$8=(-T^3-T^2)(T-T^2)=-T^3+T^5$, $16=4^2=T^4-T^8$.
Therefore, $2^k P$ (P=(x, y), where k=1, 2, 3, 4 can be replaced with:

2P=P+P
$4P=-(x^{2\ 3}, y^{2\ 3})-(x^{2\ 2}, y^{2\ 2})$
$8P=-(x^{2\ 3}, y^{2\ 3})+(x^{2\ 5}, y^{2\ 5})$
$16P=(x^{2\ 4}, y^{2\ 4})+(x^{2\ 6}, y^{2\ 6})$ where the superscript 2 3 and the like denote $2^3$ etc.

With an extension field of GF(2), operation by a second power is realized by a cyclic shift when a normalized base is used, so that it can be calculated at a very fast speed. Thus, $2^k P(k=1, 2, 3, 4)$ are calculated by simply repeating a so-called elliptic curve addition for two times, enhancing the computation speed. In particular, the elliptic curve $E_2$ over GF($2^{131}$) has an optimal normalized base (the number of the terms of multiplicative function has 2m−1, where m is 131 in this case) and it minimizes the number of ANDs and exclusive ORs necessary per multiplication, thus increasing the speed of the computation.

However, it is only a single multiplication by a specific positive integer c that is sped up by the above-described method. For this reason, to enhance the overall speed of the elliptic curve addition, an elliptic curve satisfying the following two conditions must be chosen:

1) It must be defined over GF($2^m$) with an optimal normalized base.
2) It must be an anomalous elliptic curve whose number of elements has a large prime number; that is to say, $2^i$-fold point is easily calculated, where i=1, 2, 3, 4.

There are only a handful of such elliptic curves; for these two conditions are not implicated each other; for example, $E_1$(GF($2^{101}$)) has the optimal normalized base, whereas $E_2$(GF($2^{131}$)) having no optimal normalized base can be given by a smaller finite field.

Besides the above-described method, addition chains are proposed as a solution to increase the computation speed of kP, which has been studied with the one for $g^k$ of finite field. In this proposed method, a precomputation table and the sequence of the computation are arranged in a more sophisticated manner. For example, 9P is not found by simply adding P's nine times, and instead, 9P is found by 9P=2(2(2P))+P, by one addition and three doubling. [For further information, see "Some Algorithms on Addition Chains and Their Complexity", M. J. Coster, Center for Mathematics and Computer Science Report CS-R9024]

The addition chains is faster than the third conventional application, that is to say, using a $2^i$-fold point (i=1, 2, 3, 4) in calculating kP for any k, and it is well anticipated that when excellent features of both the methods are combined, the computation can be sped up much further. However, it is not easy to combine these features in practical application. In the third conventional application where, for only a specific c, cP is sped up, addition chains can not be easily combined to speed up kP for any k.

As has been explained, in the field of cryptography exploiting irreducible EDLP, a technique such that can reduce the stored data in the smart card, public data size necessary for enciphering and deciphering has not been established to date. However, such a technique needs to be developed as the application of cryptography varies from privacy communication to STV and further to aerospace industries.

SUMMARY OF THE INVENTION

Accordingly, the present invention has an object to provide a method of generating and verifying electronic signatures and implementing privacy communication whose level of security is dependent on EDLP constructed by choosing an elliptic curve or a base point using less amount of data and computation to enhance the speed thereof.

The above object is fulfilled by a method of generating and verifying electronic signatures via a public digital network system by using an elliptic curve, comprising the steps of: supplying on the network system public data to each of users from a system provider; generating a first public key with a secretly selected integer as a first secret key, and a base point on the elliptic curve at a site of a data sender and generating a second public key with a secretly selected integer as a second secret key and the base point at a site of a data receiver wherein the first and second public keys are different; notifying the first public key to the data receiver from the data sender and notifying the second public key to the data sender from the data receiver; generating an electronic signature to be transmitted with data by using the first secret key at the site of the data sender; and verifying the electronic signature by using the first public key at the site of the data receiver, wherein the step of supplying and the public data includes the steps of: choosing an elliptic curve E having GF(q) as a field of definition where q is a power of a prime number and such that the order of a group consisting of the elements of GF(q) denoted as E((GF(q)) is divisible by a prime number of 30 or more digits; and determining an element called a base point P that gives a small absolute number to at least one of its x-coordinate denoted as x(P) and y-coordinate denoted as y(P), so that fewer parameters represent E, GF(q), P, the order of P to facilitate recovering the base point P.

The step of supplying the public data may include the steps of: choosing an elliptic curve E over GF(q) having exact p order, where $q=p^l$; and choosing an element P whose x-coordinate has 0.

The step of supplying the public data may further include the steps of: choosing d as a positive integer such that gives an imaginary quadratic field $Q((-d)^{\frac{1}{2}})$ a small class number; and choosing p as a prime number such that 4*p−1=d*square number, so that the elliptic curve having GF(p) as a field of definition will have a j-invariant as a solution modulo p for a class polynomial $H_d(x)=0$ which is determined by d.

The step of supplying the public data may include the steps of: choosing an elliptic curve E over GF(p) having exact p order, wherein p satisfies $p=3b^2+3b+1$ where b is a positive integer; and determining the base point by choosing an element P such that gives a small number to x(P).

The step of supplying the public data may include the step of: choosing a prime number p such that one of $p=2^t+\alpha$ and $p=2^t-\alpha$, where t is a positive integer and $\alpha$ is a positive integer.

The step of supplying the public data may include the steps of: choosing a prime number p such that one of $p=2^t+\alpha$ and $p=2^t-\alpha$ where t is a positive integer and $\alpha$ is a positive integer; and choosing an elliptic curve E over (GF(p)) whose E(GF(p) will have exact p order.

The positive integer $\alpha$ may be less than (2t)/3 bits + 15 bits long.

The above object is also fulfilled by a method of implementing a privacy communication via a public digital network system by using an elliptic curve, comprising the steps of: supplying on the network system public data to each of users from a system provider; generating a first public key with a secretly selected integer as a first secret key, and a base point on the elliptic curve at a site of a data sender and generating a second public key with a secretly selected integer as a data receiver key and the base point at a site of a second user wherein the first and second public keys are different; notifying the first public key to the data receiver from the data sender and notifying the second public key to the data sender from the data receiver; enciphering data to be transmitted by using the second public key at the site of the data sender; and deciphering the enciphered data by using the second secret key at the site of the data receiver, wherein the step of supplying and the public data includes the steps of: choosing an elliptic curve E having GF(q) as a field of definition where q is a power of a prime number and such that the order of a group consisting of the elements of GF(q) denoted as E((GF(q)) is divisible by a prime number of 30 or more digits; and determining an element called a base point P that gives a small absolute number to at least one of its x-coordinate denoted as x(P) and y-coordinate denoted as y(P), so that fewer parameters represent E, GF(q), P, the order of P to facilitate recovering the base point P.

The step of supplying the public data may include the steps of: choosing an elliptic curve E over GF(q) having exact p order, where $q=p^l$; and choosing an element P whose x-coordinate has 0.

The step of supplying the public data further may include the steps of: choosing d as a positive integer such that gives an imaginary quadratic field $Q((-d)^{\frac{1}{2}})$ a small class number; and choosing p as a prime number such that 4*p−1=d*square number, so that the elliptic curve having GF(p) as a field of definition will have a j-invariant as a solution modulo p for a class polynomial $H_d(x)=0$ which is determined by d.

The step of supplying the public data may include the steps of: choosing an elliptic curve E over GF(p) having exact p order, wherein p satisfies $p=3b^2+3b+1$ where b is a positive integer; and determining the base point by choosing an element P such that gives a small number to x(P).

The step of supplying the public data may include the step of: choosing a prime number p such that one of $p=2^t+\alpha$ and $p=2^t-\alpha$, where t is a positive integer and $\alpha$ is a positive integer.

The step of supplying the public data may include the steps of: choosing a prime number p such that one of $p=2^t+\alpha$ and $p=2^t-\alpha$ where t is a positive integer and $\alpha$ is a positive integer; and choosing an elliptic curve E over (GF(p)) whose E(GF(p) will have exact p order.

The positive integer $\alpha$ may be less than (2t)/3 bits + 15 bits long.

The above object is also fulfilled by a method of generating and verifying electronic signatures via a public digital network system by using an elliptic curve, comprising the steps of: supplying on the network system public data to each of the users from the provider; selecting a first secret key at a site of a first user and selecting a second secret key at a site of a second user wherein the first and second secret keys are different; notifying a number calculated with the public data and the first secret key to the second user from the first user as a first public key, and notifying a number calculated with the public data and the second secret key to the first user from the second user as a second public key; calculating a common key by using the first secret key and the second public key from the second user at the site of the first user, and calculating the common key by using the second secret key and the first public key from the first user at the site of the second user; generating a random number at the site of one of the first and second users who wishes to transmit data and subsequently ciphering the random number with the public data; generating an electronic signature to be transmitted with data at the site of one of the first and second users who wishes to transmit the data by using the random number and his own secret key; transmitting the ciphered random number and the ciphered data from the site of one of the first and second users who wishes to transmit the data to the other user; and verifying the electronic signature using the other user's public key and the ciphered random number at the site of the other user, wherein the step of supplying and the public data includes the steps of: choosing an elliptic curve E having GF(q) as a field of definition where q is a power of a prime number and such that the order of a group consisting of the elements of GF(q) denoted as E((GF(q)) is divisible by a prime number of 30 or more digits; and determining an element called a base point P that gives a small absolute number to at least one of its x-coordinate denoted as x(P) and y-coordinate denoted as y(P), so that fewer parameters represent E, GF(q), P, the order of P to facilitate recovering the base point P.

The step of supplying the public data may include the steps of: choosing an elliptic curve E over GF(q) having exact p order, where $q=p^l$; and choosing an element P whose x-coordinate has 0.

The step of supplying the public data may further include the steps of: choosing d as a positive integer such that gives an imaginary quadratic field $Q((-d)^{\frac{1}{2}})$ a small class number; and choosing p as a prime number such that 4*p−1=d*square number, so that the elliptic curve having GF(p) as a field of definition will have a j-invariant as a solution modulo p for a class polynomial $H_d(x)=0$ which is determined by d.

The step of supplying the public data may include the steps of: choosing an elliptic curve E over GF(p) having exact p order, wherein p satisfies $p=3b^2+3b+1$ where b is a positive integer; and determining the base point by choosing an element P such that gives a small number to x(P).

The step of supplying the public data may include the step of: choosing a prime number p such that one of $p=2^t+\alpha$ and $p=2^t-\alpha$, where t is a positive integer and $\alpha$ is a positive integer.

The step of supplying the public data may include the steps of: choosing a prime number p such that one of $p=2^t+\alpha$ and $p=2^t-\alpha$ where t is a positive integer and $\alpha$ is a positive integer; and choosing an elliptic curve E over (GF(p)) whose E(GF(p)) will have exact p order.

The positive integer $\alpha$ may be less than (2t)/3 bits+15 bits long.

The above object is also fulfilled by a method of implementing a privacy communication via a public digital network system by using an elliptic curve, comprising the steps of: supplying on the network system public data to each of the users from the provider; selecting a first secret key at a site of a first user and selecting a second secret key at a site of a second user wherein the first and second secret keys are different; notifying a number calculated with the public data and the first secret key to the second user from the first user as a first public key, and notifying a number calculated with the public data and the second secret key to the first user from the second user as a second public key; calculating a common key by using the first secret key and the second public key from the second user at the site of the first user, and calculating the common key by using the second secret key and the first public key from the first user at the site of the second user; generating a random number at the site of one of the first and second users who wishes to transmit data and subsequently ciphering the random number with the public data; ciphering the data to be transmitted at the site of one of the first and second users who wishes to transmit the data by using the random number and the other user's public key; transmitting the ciphered random number and the ciphered data from the site of one of the first and second users who wishes to transmit the data to the other user; and deciphering the ciphered data using his own secret key and the ciphered random number at the site of the other user, wherein the step of supplying and the public data includes the steps of: choosing an elliptic curve E having GF(q) as a field of definition where q is a power of a prime number and such that the order of a group consisting of the elements of GF(q) denoted as E((GF(q)) is divisible by a prime number of 30 or more digits; and determining an element called a base point P that gives a small absolute number to at least one of its x-coordinate denoted as x(P) and y-coordinate denoted as y(P), so that fewer parameters represent E, GF(q), P, the order of P to facilitate recovering the base point P.

The step of supplying the public data may include the steps of: choosing an elliptic curve E over GF(q) having exact p order, where $q=p^1$; and choosing an element P whose x-coordinate has 0.

The step of supplying the public data may further include the steps of: choosing d as a positive integer such that gives an imaginary quadratic field $Q((-d)^{\frac{1}{2}})$ a small class number; and choosing p as a prime number such that 4*p−1=d*square number, so that the elliptic curve having GF(p) as a field of definition will have a j-invariant as a solution modulo p for a class polynomial $H_d(x)=0$ which is determined by d.

The step of supplying the public data may include the steps of: choosing an elliptic curve E over GF(p) having exact p order, wherein p satisfies $p=3b^2+3b+1$ where b is a positive integer; and determining the base point by choosing an element P such that gives a small number to x(P).

The step of supplying the public data may include the step of: choosing a prime number p such that one of $p=2^t+\alpha$ and $p=2^t-\alpha$, where t is a positive integer and $\alpha$ is a positive integer.

The step of supplying the public data may include the steps of: choosing a prime number p such that one of $p=2^t+\alpha$ and $p=2^t-\alpha$ where t is a positive integer and $\alpha$ is a positive integer; and choosing an elliptic curve E over (GF(p)) whose E(GF(p)) will have exact p order.

The positive integer $\alpha$ may be less than (2t)/3 bits+15 bits long.

The above object is also fulfilled by a method of generating and verifying electronic signatures via a public digital network system by using an elliptic curve, comprising the steps of: supplying on the network system public data to each of the users from a network provider; selecting a secret key at a site of a data sender; notifying a number calculated with the public data and the secret key to a receiver from the sender as a public key; generating a random number at the site of the sender and subsequently ciphering the random number with the public data; generating an electronic signature to be transmitted with data at the site of the sender by using the random number and the sender's secret key; transmitting the ciphered random number and the signature of data from the sender to the receiver; and verifying the electronic signature by using the sender's public key and the ciphered random number at the site of the receiver, wherein the step of supplying and the public data includes the steps of: choosing an elliptic curve E having GF(q) as a field of definition where q is a power of a prime number and such that the order of a group consisting of the elements of GF(q) denoted as E((GF(q)) is divisible by a prime number of 30 or more digits; and determining an element called a base point P that gives a small absolute number to at least one of its x-coordinate denoted as x(P) and y-coordinate denoted as y(P), so that fewer parameters represent E, GF(q), P, the order of P to facilitate recovering the base point P.

The step of supplying the public data may include the steps of: choosing an elliptic curve E over GF(q) having exact p order, where $q=p^1$; and choosing an element P whose x-coordinate has 0.

The step of supplying the public data may further include the steps of: choosing d as a positive integer such that gives an imaginary quadratic field $Q((-d)^{\frac{1}{2}})$ a small class number; and choosing p as a prime number such that 4*p−1=d*square number, so that the elliptic curve having GF(p) as a field of definition will have a j-invariant as a solution modulo p for a class polynomial $H_d(x)=0$ which is determined by d.

The step of supplying the public data may include the steps of: choosing an elliptic curve E over GF(p) having exact p order, wherein p satisfies $p=3b^2+3b+1$ where b is a positive integer; and determining the base point by choosing an element P such that gives a small number to x(P).

The step of supplying the public data may include the step of: choosing a prime number p such that one of $p=2^t+\alpha$ and $p=2^t-\alpha$, where t is a positive integer and $\alpha$ is a positive integer.

The step of supplying the public data may include the steps of: choosing a prime number p such that one of $p=2^t+\alpha$ and $p=2^t-\alpha$ where t is a positive integer and $\alpha$ is a positive integer; and choosing an elliptic curve E over (GF(p)) whose E(GF(p)) will have exact p order.

The positive integer $\alpha$ may be less than (2t)/3 bits+15 bits long.

The above object is also fulfilled by a method of implementing a privacy communication via a public digital network system by using an elliptic curve, comprising the steps of: supplying on the network system public data to each of the users from a network provider; selecting a secret key at a site of a data sender; notifying a number calculated with the public data and the secret key to a receiver from the sender as a public key; generating a random number at the site of the sender and subsequently ciphering the random number with the public data; ciphering the data to be transmitted at the site of the sender by using the random number and the receiver's public key; transmitting the ciphered random number and the ciphered data from the sender to the receiver; and deciphering the ciphered data using his own secret key and the ciphered random number at the site of the receiver, wherein the step of supplying and the public data includes the steps of: choosing an elliptic curve E having GF(q) as a field of definition where q is a power of a prime number and such that the order of a group consisting of the elements of GF(q) denoted as E((GF(q)) is divisible by a prime number of 30 or more digits; and determining an element called a base point P that gives a small absolute number to at least one of its x-coordinate denoted as x(P) and y-coordinate denoted as y(P), so that fewer parameters represent E, GF(q), P, the order of P to facilitate recovering the base point P.

The step of supplying the public data may include the steps of: choosing an elliptic curve E over GF(q) having exact p order, where $q=p^l$; and choosing an element P whose x-coordinate has 0.

The step of supplying the public data may further include the steps of: choosing d as a positive integer such that gives an imaginary quadratic field $Q((-d)^{\frac{1}{2}})$ a small class number; and choosing p as a prime number such that $4*p-1=d*$square number, so that the elliptic curve having GF(p) as a field of definition will have a j-invariant as a solution modulo p for a class polynomial $H_d(x)=0$ which is determined by d.

The step of supplying the public data may include the steps of: choosing an elliptic curve E over GF(p) having exact p order, wherein p satisfies $p=3b^2+3b+1$ where b is a positive integer; and determining the base point by choosing an element P such that gives a small number to x(P).

The step of supplying the public data includes the step of: choosing a prime number p such that one of $p=2^t+\alpha$ and $p=2^t-\alpha$, where t is a positive integer and $\alpha$ is a positive integer.

The step of supplying the public data includes the steps of: choosing a prime number p such that one of $p=2^t+\alpha$ and $p=2^t-\alpha$ where t is a positive integer and $\alpha$ is a positive integer; and choosing an elliptic curve E over (GF(p)) whose E(GF(p)) will have exact p order.

The positive integer $\alpha$ may be less than (2t)/3 bits + 15 bits long.

The above object is also fulfilled by a method of generating and verifying electronic signatures via a public digital network system by using an elliptic curve, comprising the steps of: supplying on the network system public data to each of the users form a network provider; selecting a first secret key at a site of a first user, selecting a second secret key at a site of a second user, and selecting a third secret key at site of a third user wherein the first, second and third secret keys are different; notifying a number calculated with the public data and the first secret key to the third user from the first user as a first public key, and notifying a number calculated with the public data and the third secret key to the first user from the third user as a third public key; calculating a first common key by using the first secret key and the third public key from the third user at the site of the first user, and calculating the first common key by using the third secret key and the first public key from the first user at the site of the third user; notifying a second public key calculated with the public data and the second secret key to the third user from the second user, and notifying the third public key calculated with the public data and the third secret key to the second user from the third user; calculating a second common key by using the second secret key and the third public key from the third user at the site of the second user, and calculating the second common key by using the third secret key and the second public key from the second user at the site of the third user; generating a first electronic signature to be transmitted with data by using the first common key at the site of the first user; verifying the first electronic signature by using the first common key at the site of the third user; generating a second electronic signature to be transmitted with the data to the second user using the second common key at the site of the third user; and verifying the second electronic signature by using the second common key at the site of the second user, wherein the step of supplying and the public data includes the steps of: choosing an elliptic curve E having GF(q) as a field of definition where q is a power of a prime number and such that the order of a group consisting of the elements of GF(q) denoted as E((GF(q)) is divisible by a prime number of 30 or more digits; and determining an element called a base point P that gives a small absolute number to at least one of its x-coordinate denoted as x(P) and y-coordinate denoted as y(P), so that fewer parameters represent E, GF(q), P, the order of P to facilitate recovering the base point P.

The step of supplying the public data includes the steps of: choosing an elliptic curve E over GF(q) having exact p order, where $q=p^l$; and choosing an element P whose x-coordinate has 0.

The step of supplying the public data may further include the steps of: choosing d as a positive integer such that gives an imaginary quadratic field $Q((-d)^{\frac{1}{2}})$ a small class number; and choosing p as a prime number such that $4*p-1=d*$square number, so that the elliptic curve having GF(p) as a field of definition will have a j-invariant as a solution modulo p for a class polynomial $H_d(x)=0$ which is determined by d.

The step of supplying the public data may include the steps of: choosing an elliptic curve E over GF(p) having exact p order, wherein p satisfies $p=3b^2+3b+1$ where b is a positive integer; and determining the base point by choosing an element P such that gives a small number to x(P).

The step of supplying the public data may include the step of: choosing a prime number p such that one of $p=2^t+\alpha$ and $p=2^t-\alpha$, where t is a positive integer and $\alpha$ is a positive integer.

The step of supplying the public data may include the steps of: choosing a prime number p such that one of $p=2^t+\alpha$ and $p=2^t-\alpha$ where t is a positive integer and $\alpha$ is a positive integer; and choosing an elliptic curve E over (GF(p)) whose E(GF(p)) will have exact p order.

The positive integer $\alpha$ may be less than (2t)/3 bits + 15 bits long.

The above object is fulfilled by a method of implementing a privacy communication via a public digital network system by using an elliptic curve, comprising the steps of: supplying on the network system public data to each of the users form a network provider; selecting a first secret key at a site of a first user, selecting a second secret key at a site of a second user, and selecting a third secret key at site of a third user wherein the first, second and third secret keys are different; notifying a number calculated with the public data and the first secret key to the third user from the first user as a first public key, and notifying a number calculated with the public data and the third secret key to the first user from the third user as a third public key; calculating a first common key by using the first secret key and the third public key from the third user at the site of the first user, and calculating the first common key by using the third secret key and the first public key from the first user at the site of the third user; notifying a second public key calculated with the public data and the second secret key to the third user from the second user, and notifying the third public key calculated with the public data and the third secret key to the second user from the third user; calculating a second common key by using the second secret key and the third public key from the third user at the site of the second user, and calculating the second common key by using the third secret key and the second public key from the second user at the site of the third user; ciphering data to be transmitted using the first common key at the site of the first user; deciphering the ciphered data using the first common key at the site of the third user; re-ciphering the data to be transmitted to the second user using the second common key at the site of the third user; and deciphering the ciphered data using the second common key at the site of the second user, wherein the step of supplying and the public data includes the steps of: choosing an elliptic curve E having GF(q) as a field of definition where q is a power of a prime number and such that the order of a group consisting of the elements of GF(q) denoted as E((GF(q)) is divisible by a prime number of 30 or more digits; and determining an element called a base point P that gives a small absolute number to at least one of its x-coordinate denoted as x(P) and y-coordinate denoted as y(P), so that fewer parameters represent E, GF(q), P, the order of P to facilitate recovering the base point P.

The step of supplying the public data may include the steps of: choosing an elliptic curve E over GF(q) having exact p order, where $q=p^l$; and choosing an element P whose x-coordinate has 0.

The step of supplying the public data may further include the steps of: choosing d as a positive integer such that gives an imaginary quadratic field $Q((-d)^{\frac{1}{2}})$ a small class number; and choosing p as a prime number such that $4*p-1=d*$square number, so that the elliptic curve having GF(p) as a field of definition will have a j-invariant as a solution modulo p for a class polynomial $H_d(x)=0$ which is determined by d.

The step of supplying the public data may include the steps of: choosing an elliptic curve E over GF(p) having exact p order, wherein p satisfies $p=3b^2+3b+1$ where b is a positive integer; and determining the base point by choosing an element P such that gives a small number to x(P).

The step of supplying the public data may include the step of: choosing a prime number p such that one of $p=2^t+\alpha$ and $p=2^t-\alpha$, where t is a positive integer and $\alpha$ is a positive integer.

The step of supplying the public data may include the steps of: choosing a prime number p such that one of $p=2^t+\alpha$ and $p=2^t-\alpha$ where t is a positive integer and $\alpha$ is a positive integer; and choosing an elliptic curve E over (GF(p)) whose E(GF(p)) will have exact p order.

The positive integer $\alpha$ may be less than (2t)/3 bits+15 bits long.

The above object is also fulfilled by a method of generating and verifying electronic signatures via a television subscriber network between a program supplier and individual users, comprising the steps of: providing a communication network to a plurality of users; providing data of an elliptic curve E and an element P to each user who wishes to receive communications over the network; the users exchanging with the program supplier an enciphering key which combines the elliptic curve E, element P and a predetermined value known only to the user and the program supplier, whereby the program supplier creates an individual enciphering key for each user constructed by an algorithm with E(GF(p)) whose number of elements is exactly p, assuming that p is a prime number and E(GF(p)) is a group of elements of GF(p) on the elliptic curve E; and communicating by generating and verifying an electronic signature with the key over the network, wherein the step of supplying and the public data includes the steps of: choosing an elliptic curve E having GF(q) as a field of definition where q is a power of a prime number and such that the order of a group consisting of the elements of GF(q) denoted as E((GF(q)) is divisible by a prime number of 30 or more digits; and determining an element called a base point P that gives a small absolute number to at least one of its x-coordinate denoted as x(P) and y-coordinate denoted as y(P), so that fewer parameters represent E, GF(q), P, the order of P to facilitate recovering the base point P.

The step of supplying the public data may include the steps of: choosing an elliptic curve E over GF(q) having exact p order, where $q=p^l$; and choosing an element P whose x-coordinate has 0.

The step of supplying the public data may further include the steps of: choosing d as a positive integer such that gives an imaginary quadratic field $Q((-d)^{\frac{1}{2}})$ a small class number; and choosing p as a prime number such that $4*p-1=d*$square number, so that the elliptic curve having GF(p) as a field of definition will have a j-invariant as a solution modulo p for a class polynomial $H_d(x)=0$ which is determined by d.

The step of supplying the public data may include the steps of: choosing an elliptic curve E over GF(p) having exact p order, wherein p satisfies $p=3b^2+3b+1$ where b is a positive integer; and determining the base point by choosing an element P such that gives a small number to x(P).

The step of supplying the public data may include the step of: choosing a prime number p such that one of $p=2^t+\alpha$ and $p=2^t-\alpha$, where t is a positive integer and $\alpha$ is a positive integer.

The step of supplying the public data may include the steps of: choosing a prime number p such that one of $p=2^t+\alpha$ and $p=2^t-\alpha$ where t is a positive integer and $\alpha$ is a positive integer; and choosing an elliptic curve E over (GF(p)) whose E(GF(p)) will have exact p order.

The positive integer $\alpha$ may less than (2t)/3 bits+15 bits long.

The above object is also fulfilled by a method of implementing a privacy communication via a television subscriber network between a program supplier and individual users, comprising the steps of: providing a communication network to a plurality of users; providing data of an elliptic curve E and an element P to each user who wishes to receive communications over the network; the users exchanging with the program supplier an enciphering key which combines the elliptic curve E, element P and a predetermined value known only to the user and the program supplier, whereby the program supplier creates an individual enciphering key for each user constructed by an algorithm with E(GF(p)) whose number of elements is exactly p, assuming that p is a prime number and E(GF(p)) is a group of elements of GF(p) on the elliptic curve E; and communicating by enciphering with the key over the network, wherein the step of supplying and the public data includes the steps of: choosing an elliptic curve E having GF(q) as a field of definition where q is a power of a prime number and such that the order of a group consisting of the elements of GF(q) denoted as E((GF(q)) is divisible by a prime number of 30 or more digits; and determining an element called a base point P that gives a small absolute number to at least one of its x-coordinate denoted as x(P) and y-coordinate denoted as y(P), so that fewer parameters represent E, GF(q), P, the order of P to facilitate recovering the base point P.

The step of supplying the public data may include the steps of: choosing an elliptic curve E over GF(q) having exact p order, where $q=p^1$; and choosing an element P whose x-coordinate has 0.

The step of supplying the public data may further include the steps of: choosing d as a positive integer such that gives an imaginary quadratic field $Q((-d)^{\frac{1}{2}})$ a small class number; and choosing p as a prime number such that $4*p-1=d*$square number, so that the elliptic curve having GF(p) as a field of definition will have a j-invariant as a solution modulo p for a class polynomial $H_d(x)=0$ which is determined by d.

The step of supplying the public data may include the steps of: choosing an elliptic curve E over GF(p) having exact p order, wherein p satisfies $p=3b^2+3b+1$ where b is a positive integer; and determining the base point by choosing an element P such that gives a small number to x(P).

The step of supplying the public data may include the step of: choosing a prime number p such that one of $p=2^t+\alpha$ and $p=2^t-\alpha$, where t is a positive integer and $\alpha$ is a positive integer.

The step of supplying the public data may include the steps of: choosing a prime number p such that one of $p=2^t+\alpha$ and $p=2^t-\alpha$ where t is a positive integer and $\alpha$ is a positive integer; and choosing an elliptic curve E over (GF(p)) whose E(GF(p) will have exact p order.

The positive integer $\alpha$ may be less than $(2t)/3$ bits+15 bits long.

According to the above method, the amount of data of the public key can be decreased. Furthermore, the total amount of stored data necessary in a smart card for signature or identification scheme and that of the computation involved are decreased. Because fewer parameters can represent the elliptic curve E, base point P, field of definition GF(p), and order of the base point P, and either the x-coordinate or y-coordinate of the base point P have a small value, thus realizing a faster elliptic curve addition kP for any k.

BRIEF DESCRIPTION OF THE DRAWINGS

These and other objects, advantages and features of the invention will become apparent from the following description thereof taken in conjugation with the accompanying drawings which illustrate specific embodiments of the invention. In the drawings.

DESCRIPTION OF THE PREFERRED EMBODIMENTS

In the following three embodiments, how an elliptic curve and a base point are chosen with less amount of data and thus involving less computation is explained, and the explanation for the rest of the process is omitted, as it is identical with the conventional applications.

FIRST EMBODIMENT

Figure 1:
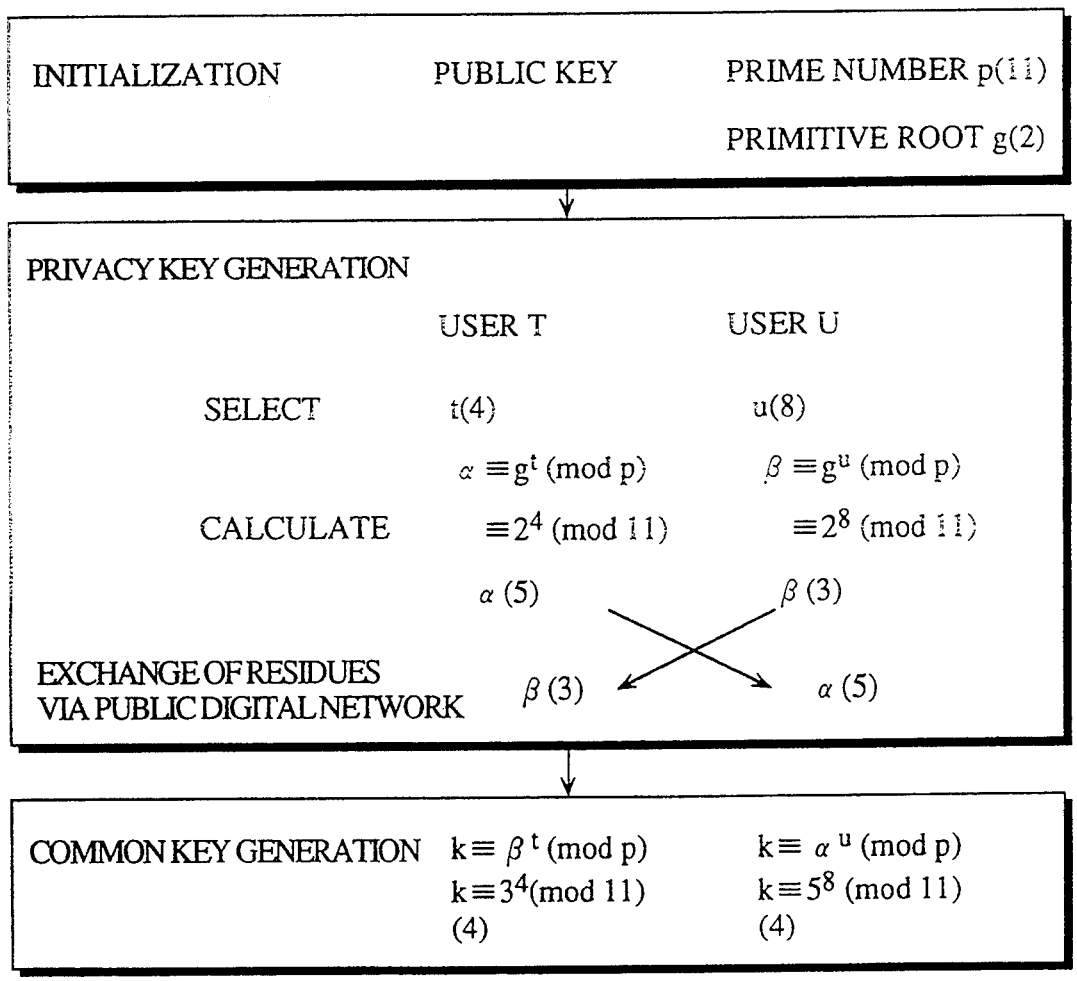
FIG. 1 is a view illustrating the procedure of cryptography applied with EDLP.
Figure 2:
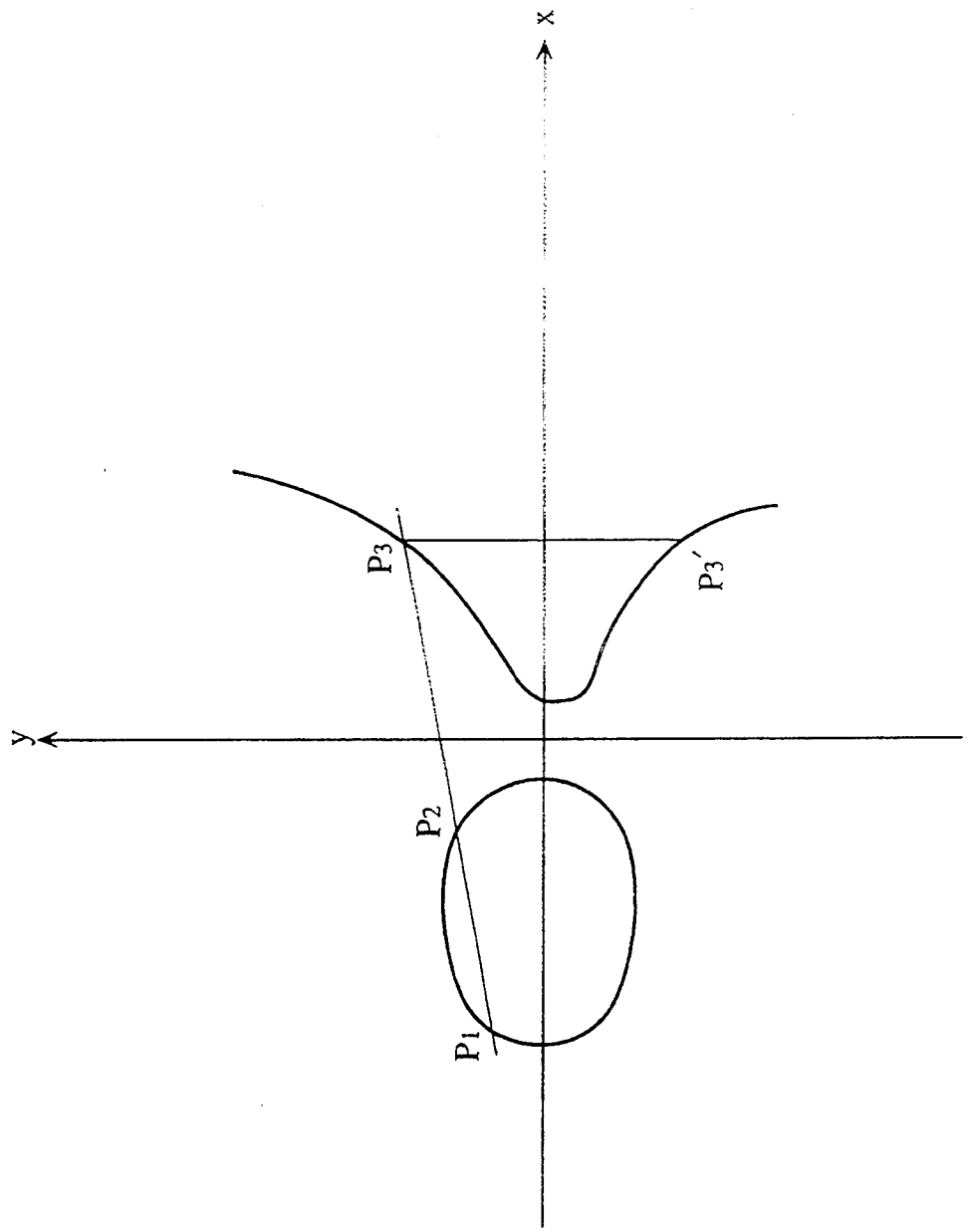
FIG. 2 is an illustration of an elliptic curve.
Figure 3:
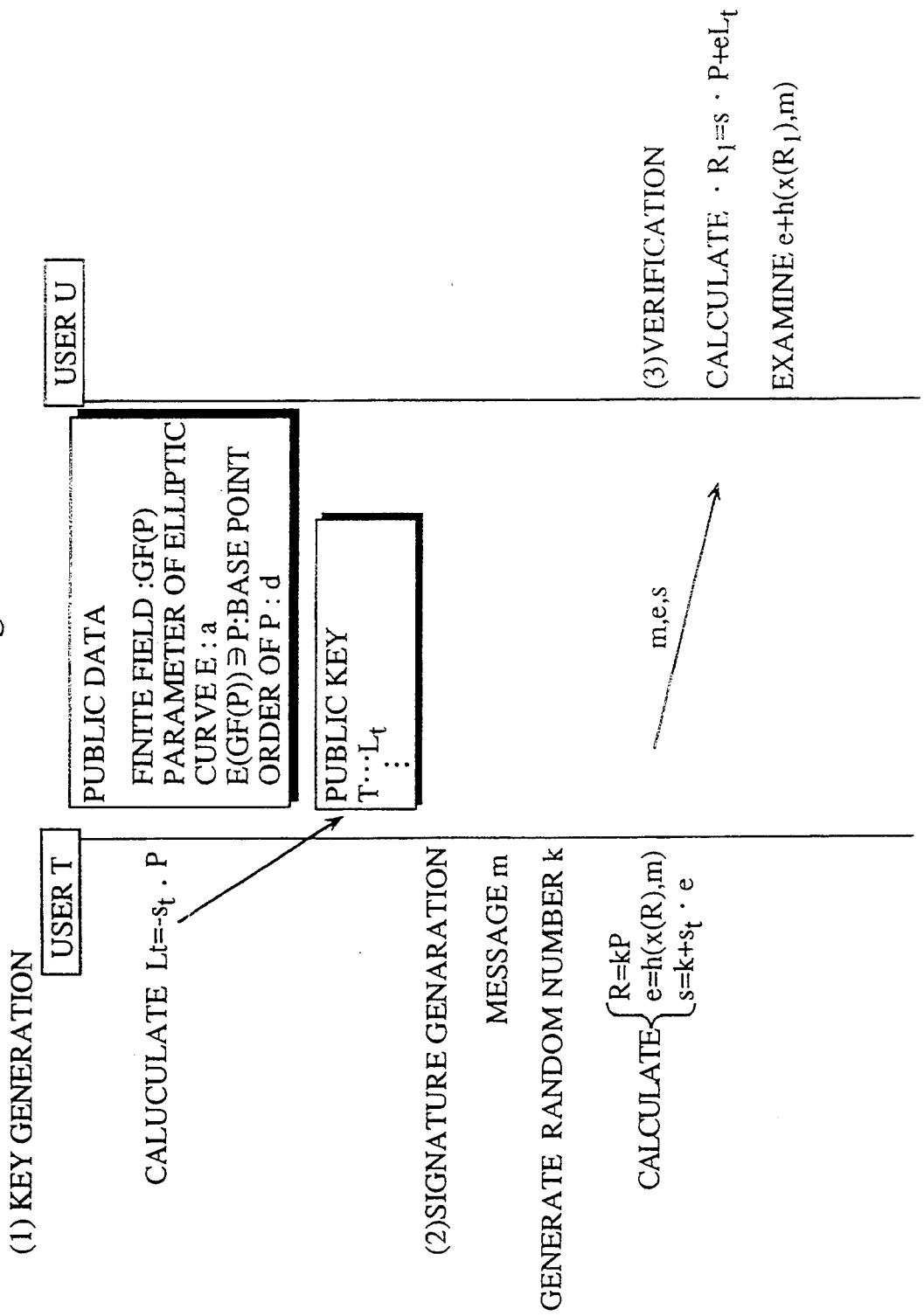
FIG. 3 is a view explaining the procedure of the first conventional application.
Figure 4:
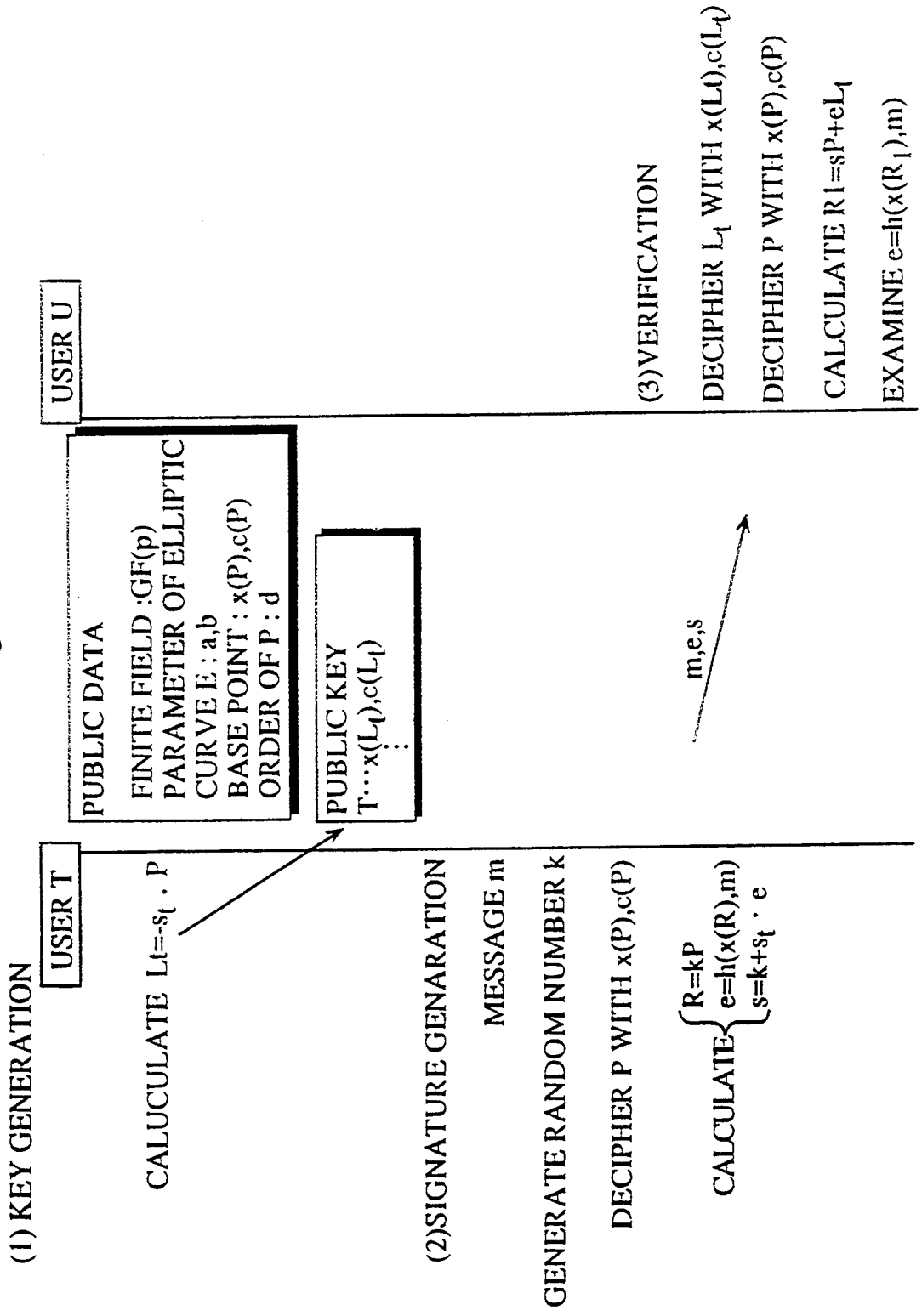
FIG. 4 is a view explaining the procedure of the second conventional application.
Figure 5:
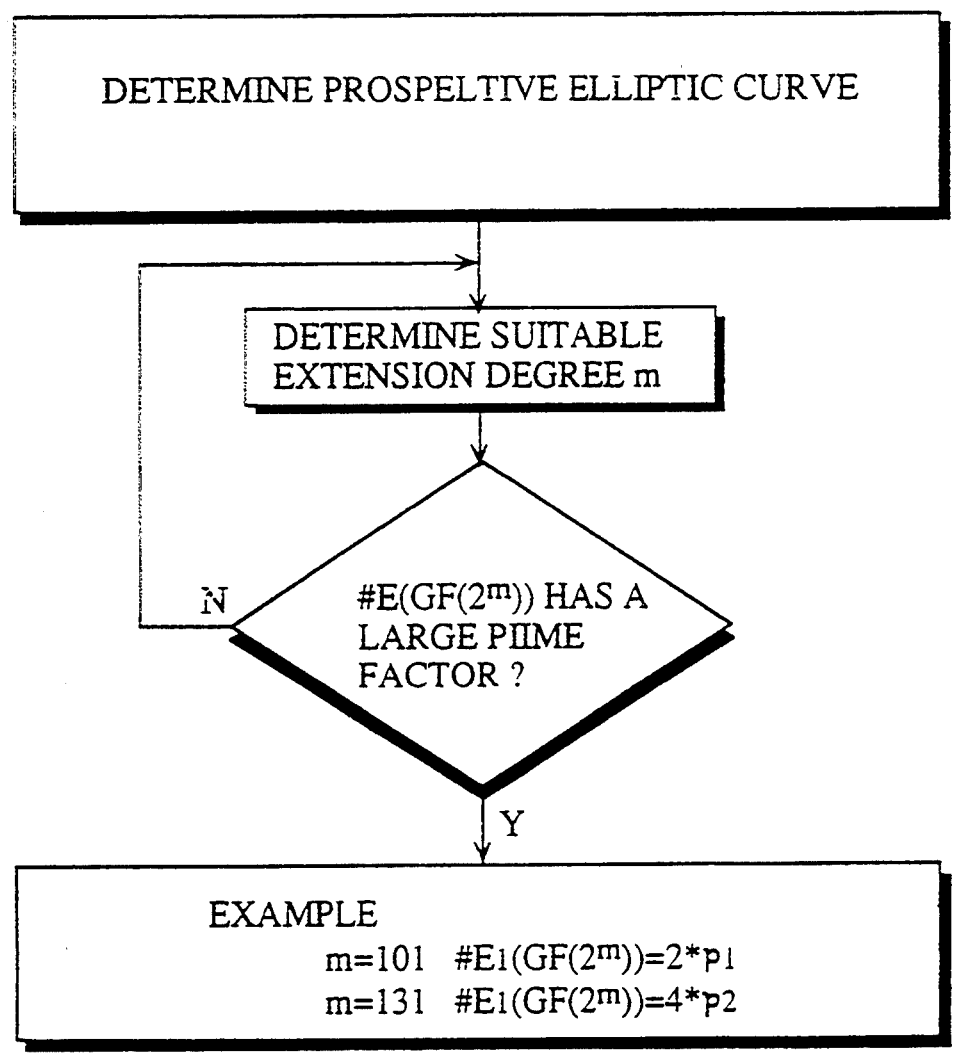
FIG. 5 is a view explaining the procedure of the third conventional application.
Figure 6:
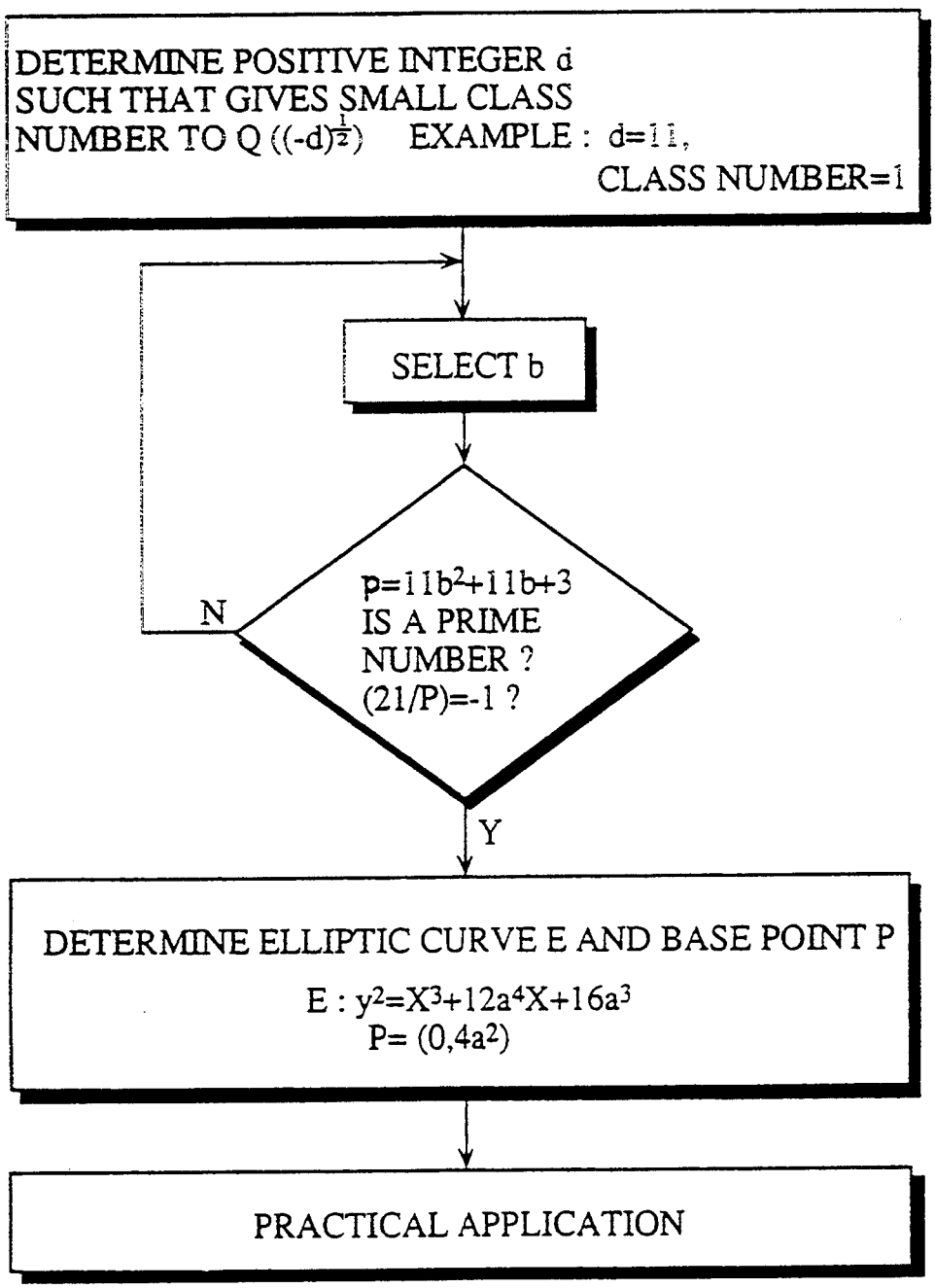
FIG. 6 is a diagram explaining the method for constructing an elliptic curve in accordance with the first embodiment of the present invention.

FIG. 6 provides a diagram detailing how an elliptic curve and a base point are chosen in accordance with the first embodiment.

in the first place, a positive integer d is determined. To simplify the computation, let d be a positive integer such that gives a small class number to an imaginary quadratic field $Q((-d)^{\frac{1}{2}})$. Integers 1, 2, 3, 7, 11, 43, 67, and 163 give a class number 1 to $Q((-d)^{\frac{1}{2}})$, and integers 10, 15, 26, 30 and so forth give a class number 2, but let d be 11 in this embodiment. [For further information about the imaginary quadratic field $Q((-d)^{\frac{1}{2}})$, see "The Arithmetic of Elliptic Curves", J. H. Silverman, Springer-Verlag, 1986]

Next, a prime number p such that $p=11b^2+11b+3$ is generated through trial and error, where b is a positive integer of approximately 15 decimal digits, and such that 21 is a non-quadratic residue modulo p, in other words, there exists no integer such that $x^2\equiv 21 \pmod{p}$.

It is known from the prime number theory that there can be found one prime number in approximately every seventy numbers if they are approximately 30 decimal digits. From Fermat's small theorem, it is also known that decimal digits of that long can be checked whether they are prime numbers or not with the aid of today's advanced computers. Also, whether an element is a quadratic residue mod p or not can be easily checked by computing Legendre symbol.

Assume we have p= 10000 00000 00069 78450 06142 01619 in this embodiment.

Then, a base point P and an elliptic curve E is determined. Since an elliptic curve defined over GF(p) whose number of elements has exactly p is given by:

$$E: y^2=x^3+12a^4x+16a^3$$

where a= 1669 75881 26171 20705 94717 59082 a base point P whose x-coordinate is 0, $P=(0, 4a^2)$ is found from E(GF(p)). [For further information, see "Elliptic Curves over $F_p$ Suitable for Cryptosystems—Abstract of Proceeding of Auscrypt '92. 1992" Atsuko Miyaji.

When the elliptic curve E chosen and the base point P found in the above-described method is applied to the second conventional application, the amount of data is calculated in the same way. The public data of
p = 10000 00000 00069 78450 06142 01619
a = 1669 75881 26171 20705 94717 59082
are referred to as the system key herein.

The amount of computation is calculated in the same way as the second conventional application.
The amount of data is:
the system key: 194 bits
the secret key: 97 bits
the public key: 98 bits
(the data of y-coordinate and a sign)
The amount of computation is:
generating the signature: 1470m(97) (1467m + 1m + 2m)
verifying the signature: 1926m(97) (1758m + 16m + 152m)

Thus, 291(194+97) bits are stored in the smart card, which is approximately a half compared with the first and second conventional applications. Moreover, the amount of computation for signature generation is reduced by approximately 6% and 14% compared with the first and second applications, respectively.

As a result, the signed communication can be implemented by storing less amount of data and carrying out less amount of computation in the smart card at a higher speed.

As previously mentioned, a positive integer d and a prime number p are not limited to the above-specified number, and other numbers are available as long as they satisfy the aforementioned conditions.

SECOND EMBODIMENT

Figure 7:
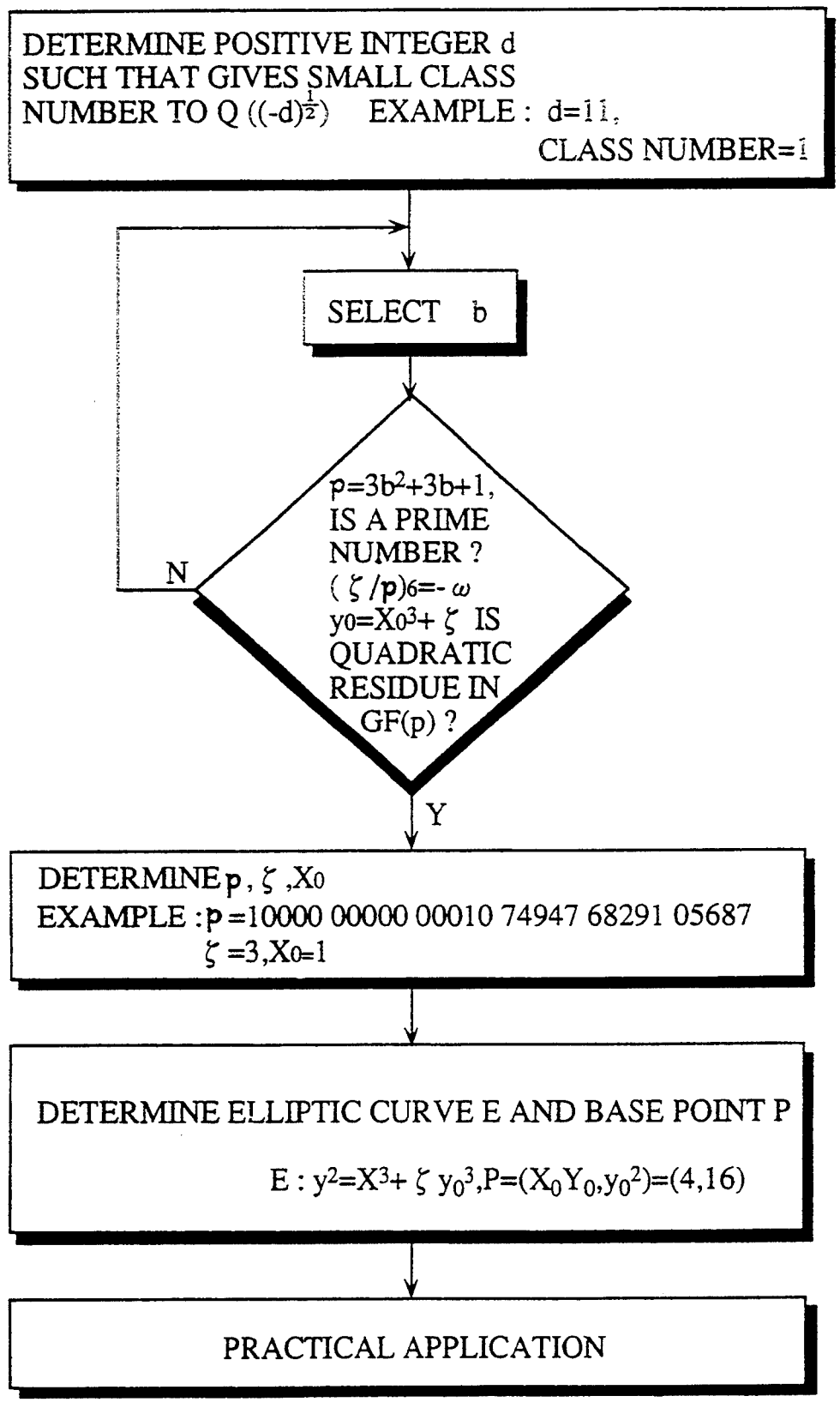
FIG. 7 is a diagram explaining the method for constructing an elliptic curve in accordance with the second embodiment of the present invention.

FIG. 7 provides a diagram detailing how an elliptic curve and a base point are chosen in accordance with the second embodiment.

In the first place, a prime number p is generated such that $p = 3b^2 + 3b + 1$, and $(\zeta/p)_6 = -\omega$, and such that $y_0 = x_0^3 + \zeta$ is a quadratic residue of GF(p) where $(\zeta/p)_6$ is a sixth power residue determined by a quadratic residue and a cubic residue and $\omega = (-1 + (-3)^{\frac{1}{2}})/2$. [For further information of sixth power residue, see "A Classical Introduction to Modern Number Theory", K. Ireland, M. Rosen, Springer-Verlag, 1972]

Assume we have p = 10000 00000 00010 74947 68291 05687, then, we get $\zeta = 3, x_0 = 1$ Next, a base point P and an elliptic curve E is determined. Since an elliptic curve defined over GF(p) whose number of elements has exactly p is given by:

$$E: y^2 = x^3 + \zeta y_0^3$$

a base point P $x_0 = 1$ and $\zeta = 3$, $P = (x_0 y_0, y_0^2) = (4, 16)$, is found from E(GF(p)).

When the elliptic curve E constructed and the base point P found in the above-described method is applied to the second conventional application, the amount of data is calculated in the same way. The public data of
p = 10000 00000 00010 74947 68291 05687
$\zeta = 3, x_0 = 1$
are referred to as the system key herein.

The amount of computation in generating signature is calculated in the same way as the first conventional application, and the second conventional application for verifying the signature.
The amount of data is:
the system key: 100 bits
the secret key: 97 bits
the public key: 98 bits
The amount of computation is:
generating the signature: 1274m(97) (1273m + 1m)
verifying the signature: 1729m(97) (1564m + 16m + 149m)

Thus, 197(100+97) bits are stored in the smart card, which is one third compared with the first and second conventional applications. This is because $\alpha$ and t are stored instead of P. Moreover, the amount of computation for signature generation is reduced by approximately 19% and 26% compared with the first and second conventional applications, respectively.

As a result, the singed communication can be implemented by storing less amount of data and carrying out less amount of computation in the smart card at a higher speed.

A prime number p is not limited to the above-specified number, and the base point P found in the above-described method can be applied to other cryptography depending its level of security on EDLP.

THIRD EMBODIMENT

Figure 8:
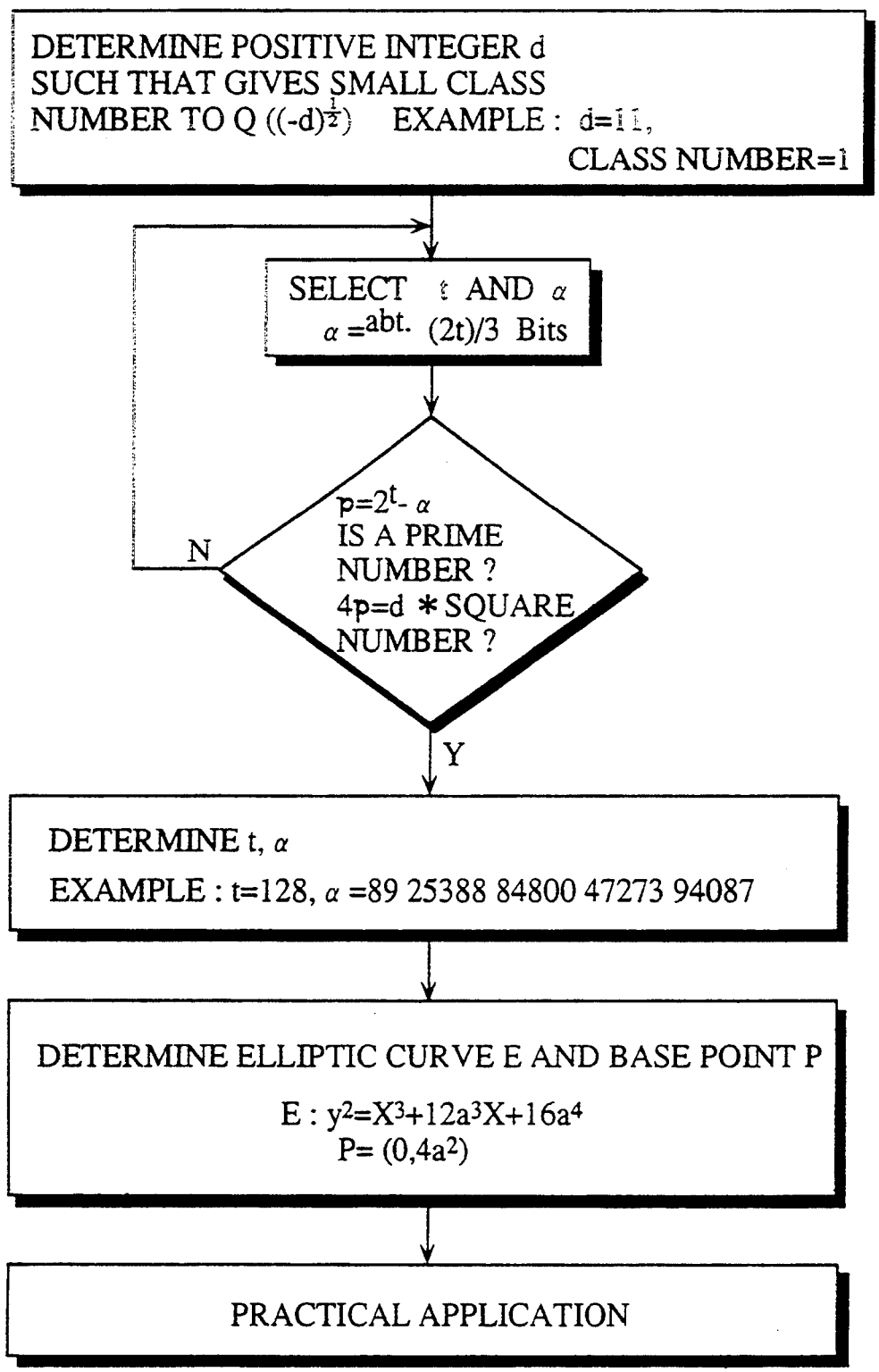
FIG. 8 is a diagram explaining the method for construction an elliptic curve in accordance with the third embodiment of the present invention.

FIG. 8 provides a diagram detailing how an elliptic curve is constructed in accordance with the third embodiment.

In the first place, a positive integer d is determined such that gives a small class number to an imaginary quadratic field $Q((-d)^{\frac{1}{2}})$, and let 11 be chosen in this embodiment.

Next, a prime number p is generated such that $4p = 11*$a square number and $2^t - \alpha$, where t is a positive integer and $\alpha$ is a number of approximately (2t)/3 bits long. $\alpha$, which is smaller than (2t)/3 bits long, will do.

To satisfy 4p = d*a square number, a positive integer d has one of 11, 43, 67, 163, and a prime number p always gives an odd number to $\alpha$.

Assume we have t = 128, $\alpha$ = 89 25388 84800 47273 94087 in this embodiment. These numbers are found by examining whether $2^t - \alpha$ is a prime number and it satisfies $\zeta 11*(\text{integer})^{2\zeta/4}$ or not. A prime number p such that $p = 2^t + \alpha$ is also available.

Then, a base point P and an elliptic curve E is determined. Since an elliptic curve defined over GF(p) whose number of elements has exactly p is given by:

$$E: y^2 = x^3 + 12a^3 x + 16a^4$$

where a = 1887 65172 00252 43003 83780 59753 00282 08521, a base point P whose x-coordinate is 0, $P = (0, 4a^2)$, is found from E(GF(p)).

When the elliptic curve E constructed and the base point P found in the above-described method is applied to the second conventional application, the order of the base point P is divisible by a large prime number, making it impossible to apply to the MOV reduction. As a result, the privacy communication exploiting cryptography of the third embodiment can establish a higher level of security.

Given that the basic computation is multiplication over GF(p), $p = 2^t \pm \alpha$, it can be realized much faster than multiplication over a typical finite field. Also, this multiplication can be combined with the addition chains, which results in speeding up overall computation. Moreover, given that a prime number p is replaced with t and $\alpha$, the amount of the data to be stored is reduced to two thirds.

Like the first embodiment, a positive integer d and a prime number p are not limited to the above-specified number, and other numbers are available as long as they satisfy the aforementioned conditions.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A method of generating and verifying electronic signatures via a public digital network system by using an elliptic curve, comprising the steps of:

supplying on the network system public data to each of users from a system provider;

generating a first public key with a secretly selected integer as a first secret key and a base point on the elliptic curve at a site of a first user, and generating a second public key with a secretly selected integer as a second secret key and the base point at a site of a second user, wherein the first and second public keys are different;

notifying the second user of the first public key from the first user and notifying the first user of the second public key from the second user;

selecting an enciphering and deciphering method by the first user and the second user prior to data transmission, the selected method using one of combinations of the first secret key of the first user and the second public key of the second user, and the second secret key of the second user and the first public key of the first user;

generating an electronic signature to be transmitted with data by using the secret key at the site of the user transmitting the data; and verifying the electronic signature by using the notified public key at the site of the user receiving the data, wherein the step of supplying the public data includes the steps of:

choosing an elliptic curve E having GF(q) as a field of definition where q is a power of a prime number, and where the order of a group consisting of the elements of GF(q) denoted as E((GF(q)) is divisible by a prime number of 30 or more digits; and determining an element called a base point P that gives a small absolute number less than 32 bits to at least one of its x-coordinate denoted as x(P) and y-coordinate denoted as y(P), so that fewer parameters represent E, GF(q), P, the order of P to facilitate recovering the base point P.

2. The method of claim 1, wherein the step of supplying the public data includes the steps of:

choosing an elliptic curve E over GF(q) having p elements, where $q = p^1$; and choosing an element P whose x-coordinate is 0.

3. The method of claim 2, wherein the step of supplying the public data further includes the step of:

choosing p as a prime number that satisfies $4*p - 1 = d*(integer)^2$, so that the elliptic curve having GF(p) as a field of definition will have a j-invariant as a solution modulo p for a class polynomial $H_d(X) = 0$ which is determined by d, where d is a positive integer.

4. The method of claim 1, wherein the step of supplying the public data includes the steps of:

choosing an elliptic curve E over GF(p) having p elements, wherein p satisfies $p = 3b^2 + 3b + 1$ where b is a positive integer; and determining the base point by choosing an element P that gives a small number to x(P).

5. The method of claim 1, wherein the step of supplying the public data includes the step of:

choosing a prime number, wherein p satisfies one of $p = 2^t + \alpha$ and $p = 2^t - \alpha$, where t is a positive integer and $\alpha$ is a positive integer.

6. The method of claim 1, wherein the step of supplying the public data includes the steps of:

choosing a prime number p, wherein p satisfies one of $p = 2^t + \alpha$ and $p = 2^t - \alpha$, where t is a positive integer and $\alpha$ is a positive integer; and choosing an elliptic curve E over (GF(p)) whose E(GF(p)) will have p elements.

7. The method of claim 6, wherein the positive integer $\alpha$ is less than (2t)/3 bits + 15 bits long.

8. A method of implementing a privacy communication via a public digital network system by using an elliptic curve, comprising the steps of:

supplying on the network system public data to each of users from a system provider;

generating a first public key with a secretly selected integer as a first secret key, and a base point on the elliptic curve at a site of a first user and generating a second public key with a secretly selected integer as a second secret key and the base point at a site of a second user wherein the first and second public keys are different;

notifying the second user of the first public key from the first user and notifying the first user of the second public key from the second user;

selecting an enciphering and deciphering method by the first user and the second user prior to data transmission, the selected method using one of combinations of the secret key of the first user and the public key of the second user, and the secret key of the second user and the public key of the first user;

enciphering data to be transmitted by using the notified public key at the site of the data sender; and deciphering the enciphered data by using the his own secret key at the site of the data receiver, wherein the step of supplying and the public data includes the steps of:

choosing an elliptic curve E having GF(q) as a field of definition where q is a power of a prime number, and where the order of a group consisting of the elements of GF(q) denoted as E((GF(q)) is divisible by a prime number of 30 or more digits; and determining an element called a base point P that gives a small absolute number less than 32 bits to at least one of its x-coordinate denoted as x(P) and y-coordinate denoted as y(P), so that fewer parameters represent E, GF(q), P, the order of P to facilitate recovering the base point P.

9. The method of claim 8, wherein the step of supplying the public data includes the steps of:

choosing an elliptic curve E over GF(q) having p elements, where $q = p^1$; and choosing an element P whose x-coordinate is 0.

10. The method of claim 9, wherein the step of supplying the public data further includes the steps of:
choosing d as a positive integer that gives an imaginary quadratic field $Q((-d)^{\frac{1}{2}})$ a small class number less than 101; and
choosing p as a prime number that satisfies $4*p-1=d*(integer)^2$, so that the elliptic curve having GF(p) as a field of definition will have a j-invariant as a solution modulo p for a class polynomial $H_d(x)=0$ which is determined by d.

11. The method of claim 8, wherein the step of supplying the public data includes the steps of:
choosing an elliptic curve E over GF(p) having p elements, wherein p satisfies $p=3b^2+3b+1$ where b is a positive integer; and
determining the base point by choosing an element P that gives a small number to x(P).

12. The method of claim 8, wherein the step of supplying the public data includes the step of:
choosing a prime number p, wherein p satisfies one of $p=2^t=\alpha$ and $p=2^t-\alpha$, where t is a positive integer and $\alpha$ is a positive integer.

13. The method of claim 8, wherein the step of supplying the public data includes the steps of:
choosing a prime number p, wherein p satisfies one of $p=2^t+\alpha$ and $p=2^t=\alpha$, where t is a positive integer and $\alpha$ is a positive integer; and
choosing an elliptic curve E over (GF(p)) whose E(Gf(p)) will have p elements.

14. The method of claim 13, wherein the positive integer $\alpha$ is less than (2t)/3 bits + 15 bits long.

15. A method of generating and verifying electronic signatures via a public digital network system by using an elliptic curve, comprising the steps of:
supplying on the network system public data to each of the users from the provider;
selecting a first secret key at a site of a first user and selecting a second secret key at a site of a second user wherein the first and second secret keys are different;
notifying the second user of a number that was calculated at the site of the first user with the public data and the first secret key as a first public key, and notifying the first user of a number that was calculated at the site of the second user with the public data and the second secret key as a second public key;
calculating a common key by using the first secret key and the second public key from the second user at the site of the first user, and calculating the common key by using the second secret key and the first public key from the first user at the site of the second user;
generating an electronic signature to be transmitted with data at the site of one of the first and second users who wishes to transmit the data by using the common key;
transmitting the signature of data from the site of one of the first and second users who wishes to transmit the data to the other user; and
verifying the electronic signature using the common key at the site of the other user,
wherein the step of supplying and the public data includes the steps of:
choosing an elliptic curve E having GF(q) as a field of definition where q is a power of a prime number, and where the order of a group consisting of the elements of GF(q) denoted as E((GF(q)) is divisible by a prime number of 30 or more digits; and
determining an element called a base point P that gives a small absolute number less than 32 bits to at least one of its x-coordinate denoted as x(P) and y-coordinate denoted as y(P), so that fewer parameters represent E, GF(q), P, the order of P to facilitate recovering the base point P.

16. The method of claim 15, wherein the step of supplying the public data includes the steps of:
choosing an elliptic curve E over GF(q) having p elements, where $q=p^1$; and
choosing an element P whose x-coordinate is 0.

17. The method of claim 16, wherein the step of supplying the public data further includes the step of:
choosing p as a prime number that satisfies $4*p-1=d*(integer)^2$, so that the elliptic curve having GF(p) as a field of definition will have a j-invariant as a solution modulo p for a class polynomial $H_d(x)=0$ which is determined by d, where d is a positive integer.

18. The method of claim 15, wherein the step of supplying the public data includes the steps of:
choosing an elliptic curve E over GF(p) having p elements, wherein p satisfies $p=3b^2+3b+1$ where b is a positive integer; and
determining the base point by choosing an element P that gives a small number to x(P).

19. The method of claim 15, wherein the step of supplying the public data includes the step of:
choosing a prime number p, wherein p satisfies one of $p=2^t+\alpha$ and $p=2^t-\alpha$, where t is a positive integer and $\alpha$ is a positive integer.

20. The method of claim 15, wherein the step of supplying the public data includes the steps of:
choosing a prime number p, wherein p satisfies one of $p=2^t+\alpha$ and $p=2^t-\alpha$, where t is a positive integer and $\alpha$ is a positive integer; and
choosing an elliptic curve E over (GF(p)) whose E(GF(p)) will have p elements.

21. The method of claim 20, wherein the positive integer $\alpha$ is less than (2t)/3 bits + 15 bits long.

22. A method of implementing a privacy communication via a public digital network system by using an elliptic curve, comprising the steps of:
supplying on the network system public data to each of the users from the system provider;
selecting a first secret key at a site of a first user and selecting a second secret key at a site of a second user wherein the first and second secret keys are different;
notifying the second user of a number that was calculated at the site of the first user with the public data and the first secret key as a first public key, and notifying the first user of a number that was calculated at the site of the second user with the public data and the second secret key as a second public key;
calculating a common key by using the first secret key and the second public key from the second user at the site of the first user, and calculating the common key by using the second secret key and the first public key from the first user at the site of the second user;
ciphering the data to be transmitted at the site of one of the first and second users who wishes to transmit the data by using the common key;

transmitting the ciphered data from the site of one of the first and second users who wishes to transmit the data to the other user; and deciphering the ciphered data using common key at the site of the other user, wherein the step of supplying and the public data includes the steps of:

choosing an elliptic curve E having GF(q) as a field of definition where q is a power of a prime number, and where the order of a group consisting of the elements of GF(q) denoted as E((GF(q)) is divisible by a prime number of 30 or more digits; and determining an element called a base point P that gives a small absolute number less than 32 bits to at least one of its x-coordinate denoted as x(P) and y-coordinate denoted as y(P), so that fewer parameters represent E, GF(q), P, the order of P to facilitate recovering the base point P.

23. The method of claim 22, wherein the step of supplying the public data includes the steps of:

choosing an elliptic curve E over GF(q) having p elements, where $Q=p^l$; and choosing an element P whose x-coordinate is 0.

24. The method of claim 23, wherein the step of supplying the public data further includes the steps of:

choosing p as a prime number that satisfies $4*p-1=d*(integer)^2$, so that the elliptic curve having GF(p) as a field of definition will have a j-invariant as a solution modulo p for a class polynomial $H_d(x)=0$ which is determined by d, where d is a positive integer.

25. The method of claim 22, wherein the step of supplying the public data includes the steps of:

choosing an elliptic curve E over GF(p) having p elements, wherein p satisfies $p=3b^2+3b+1$ where b is a positive integer; and determining the base point by choosing an element P that gives a small number to x(P).

26. The method of claim 22, wherein the step of supplying the public data includes the step of:

choosing a prime number p, wherein p satisfies one of $p=2^t+\alpha$ and $p=2^t-\alpha$, where t is a positive integer and $\alpha$ is a positive integer.

27. The method of claim 22, wherein the step of supplying the public data includes the steps of:

choosing a prime number p, wherein p satisfies one of $p=2^t+\alpha$ and $p=2^t-\alpha$, where t is a positive integer and $\alpha$ is a positive integer; and choosing an elliptic curve E over (GF(p)) whose E(GF(p)) will have p elements.

28. The method of claim 27, wherein the positive integer $\alpha$ is less than $(2t)/3$ bits + 15 bits long.

29. A method of generating and verifying electronic signatures via a public digital network system by using an elliptic curve, comprising the steps of:

supplying on the network system public data to each of the users from a network provider;

selecting a secret key at a site of a first user;

notifying the second user of a number that was calculated at the site of the first user with the public data and the secret key as a public key;

generating a random number at the site of the first user and subsequently ciphering the random number with the public data;

generating an electronic signature to be transmitted with data at the site of the first user by using the random number and the secret key;

transmitting the ciphered random number and the signature of data from the first user to the second user; and verifying the electronic signature by using the public key and the ciphered random number at the site of the second user, wherein the step of supplying and the public data includes the steps of:

choosing an elliptic curve E having GF(q) as a field of definition where q is a power of a prime number, and where the order of a group consisting of the elements of GF(q) denoted as E((GF(q)) is divisible by a prime number of 30 or more digits; and determining an element called a base point P that gives a small absolute number less than 32 bits to at least one of its x-coordinate denoted as x(P) and y-coordinate denoted as y(P), so that fewer parameters represent E, GF(q), P, the order of P to facilitate recovering the base point P.

30. The method of claim 29, wherein the step of supplying the public data includes the steps of:

choosing an elliptic curve E over GF(q) having p elements, where $q=p^l$; and choosing an element P whose x-coordinate is 0.

31. The method of claim 30, wherein the step of supplying the public data further includes the step of:

choosing p as a prime number that satisfies $4*p-1=d*(integer)^2$, so that the elliptic curve having GF(p) as a field of definition will have a j-invariant as a solution modulo p for a class polynomial $H_d(x)=0$ which is determined by d, where d is a positive integer.

32. The method of claim 29, wherein the step of supplying the public data includes the steps of:

choosing an elliptic curve E over GF(p) having p elements, wherein p satisfies $p=3b^2+3b+1$ where b is a positive integer; and determining the base point by choosing an element P that gives a small number to x(P).

33. The method of claim 29, wherein the step of supplying the public data includes the step of:

choosing a prime number p, wherein p satisfies one of $p=2^t+\alpha$ and $p=2^t-\alpha$, where t is a positive integer and $\alpha$ is a positive integer.

34. The method of claim 29, wherein the step of supplying the public data includes the steps of:

choosing a prime number p, wherein p satisfies one of $p=2^t+\alpha$ and $p=2^t-\alpha$, where t is a positive integer and $\alpha$ is a positive integer; and choosing an elliptic curve E over (GF(p)) whose E(GF(p)) will have p elements.

35. The method of claim 34, wherein the positive integer $\alpha$ is less than $(2t)/3$ bits + 15 bits long.

36. A method of implementing a privacy communication via a public digital network system by using an elliptic curve, comprising the steps of:

supplying on the network system public data to each of the users from a network provider;

selecting a secret key at a site of a first user;

notifying the second user of a number that was calculated at the site of the first user with the public data and the secret key as a public key;

generating a random number at the site of the first user and subsequently ciphering the random number with the public data;

ciphering the data to be transmitted at the site of the second user by using the random number and the public key;

transmitting the ciphered random number and the ciphered data from the second user to the first user; and deciphering the ciphered data using secret key and the ciphered random number at the site of the first user, wherein the step of supplying and the public data includes the steps of:

choosing an elliptic curve E having GF(q) as a field of definition where q is a power of a prime number, and where the order of a group consisting of the elements of GF(q) denoted as E((GF(q)) is divisible by a prime number of 30 or more digits; and determining an element called a base point P that gives a small absolute number less than 32 bits to at least one of its x-coordinate denoted as x(P) and y-coordinate denoted as y(P), so that fewer parameters represent E, GF(q), P, the order of P to facilitate recovering the base point P.

37. The method of claim 36, wherein the step of supplying the public data includes the steps of:

choosing an elliptic curve E over GF(q) having p elements, where $q=p^1$; and choosing an element P whose x-coordinate is 0.

38. The method of claim 37, wherein the step of supplying the public data further includes the step of:

choosing p as a prime number that satisfies $4*p-1=d*(integer)^2$, so that the elliptic curve having GF(p) as a field of definition will have a j-invariant as a solution modulo p for a class polynomial $H_d(x)=0$ which is determined by d, where d is a positive integer.

39. The method of claim 36, wherein the step of supplying the public data includes the steps of:

choosing an elliptic curve E over GF(p) having p elements, wherein p satisfies $p=3b^2+3b+1$ where b is a positive integer; and determining the base point by choosing an element P that gives a small number to x(P).

40. The method of claim 36, wherein the step of supplying the public data includes the step of:

choosing a prime number p that satisfies one of $p=2^t+\alpha$ and $p=2^t-\alpha$, where t is a positive integer and $\alpha$ is a positive integer.

41. The method of claim 36, wherein the step of supplying the public data includes the steps of:

choosing a prime number p, wherein p satisfies one of $p=2^t+\alpha$ and $p=2^t-\alpha$, where t is a positive integer and $\alpha$ is a positive integer; and choosing an elliptic curve E over (GF(p)) whose E(GF(p)) will have p elements.

42. The method of claim 41, wherein the positive integer $\alpha$ is less than (2t)/3 bits +15 bits long.

43. A method of generating and verifying electronic signatures via a public digital network system by using an elliptic curve, comprising the steps of:

supplying on the network system public data to each of the users from the system provider;

selecting a first secret key at a site of a first user, selecting a second secret key at a site of a second user, and selecting a third secret key at a site of a third user wherein the first, second and third secret keys are different;

notifying the third user of a number that was calculated at the site of the first user with the public data and the first secret key as a first public key, and notifying the first user of a number that was calculated at the site of the third user with the public data and the second secret key as a third public key;

calculating a common key by using the first secret key and the third public key from the third user at the site of the first user, and calculating the first common key by using the third secret key and the first public key from the first user at the site of the third user;

notifying the third user of a second public key that was calculated at the site of second user with the public data and the second secret key, and notifying the second user of the third public key that was calculated at the site of the third user with the public data and the third secret key;

calculating a second common key by using the second secret key and the third public key from the third user at the site of the second user, and calculating the second common key by using the third secret key and the second public key from the second user at the site of the third user;

generating a first electronic signature to be transmitted with data by using the first common key at the site of the first user;

verifying the first electronic signature by using the first common key at the site of the third user;

generating a second electronic signature to be transmitted with the data to the second user using the second common key at the site of the third user; and verifying the second electronic signature by using the second common key at the site of the second user, wherein the step of supplying and the public data includes the steps of:

choosing an elliptic curve E having GF(q) as a field of definition where q is a power of a prime number, and where the order of a group consisting of the elements of GF(q) denoted as E((GF(q)) is divisible by a prime number of 30 or more digits; and determining an element called a base point P that gives a small absolute number less than 32 bits to at least one of its x-coordinate denoted as x(P) and y-coordinate denoted as y(P), so that fewer parameters represent E, GF(q), P, the order of P to facilitate recovering the base point P.

44. The method of claim 43, wherein the step of supplying the public data includes the steps of:

choosing an elliptic curve E over GF(q) having p elements, where $q=p^1$; and choosing an element P whose x-coordinate is 0.

45. The method of claim 44, wherein the step of supplying the public data further includes the steps of:

choosing p as a prime number that satisfies $4*p-1=d*(integer)^2$, so that the elliptic curve having GF(p) as a field of definition will have a j-invariant as a solution modulo p for a class polynomial $H_d(x)=0$ which is determined by d, where d is a positive integer.

46. The method of claim 43, wherein the step of supplying the public data includes the steps of:

choosing an elliptic curve E over GF(p) having p elements, wherein p satisfies $p=3b^2+3b+1$ where b is a positive integer; and determining the base point by choosing an element P that gives a small number to x(P).

47. The method of claim 43, wherein the step of supplying the public data includes the step of:
choosing a prime number p, wherein p satisfies one of $p=2^t+\alpha$ and $p=2^t-\alpha$, where t is a positive integer and $\alpha$ is a positive integer.

48. The method of claim 43, wherein the step of supplying the public data includes the steps of:
choosing a prime number p, wherein p satisfies one of $p=2^t+\alpha$ and $p=2^t-\alpha$, where t is a positive integer and $\alpha$ is a positive integer; and
choosing an elliptic curve E over (GF(p)) whose E(GF(p)) will have p elements.

49. The method of claim 48, wherein the positive integer $\alpha$ is less than (2t)/3 bits+15 bits long.

50. A method of implementing a privacy communication via a public digital network system by using an elliptic curve, comprising the steps of:
supplying on the network system public data to each of users from a network provider;
selecting a first secret key at a site of a first user, selecting a second secret key at a site of a second user, and selecting a third secret key at a site of a third user wherein the first, second and third secret keys are different;
notifying the third user of a number that was calculated at the site of the first user with the public data and the first secret key as a first public key, and notifying the first user of a number that was calculated at the site of the third user with the public data and the second secret key as a third public key;
calculating a first common key by using the first secret key and the third public key from the third user at the site of the first user, and calculating the first common key by using the third secret key and the first public key from the first user at the site of the third user;
notifying the third user of a second public key that was calculated at the site of the second user with the public data and the second secret key, and notifying the second user of the third public key that was calculated at the site of the third user with the public data and the third secret key;
calculating a second common key by using the second secret key and the third public key from the third user at the site of the second user, and calculating the second common key by using the third secret key and the second public key from the second user at the site of the third user;
ciphering data to be transmitted using the first common key at the site of the first user;
deciphering the ciphered data using the first common key at the site of the third user;
re-ciphering the data to be transmitted to the second user using the second common key at the site of the third user; and
deciphering the ciphered data using the second common key at the site of the second user,
wherein the step of supplying and the public data includes the steps of:
choosing an elliptic curve E having GF(q) as a field of definition where q is a power of a prime number, and where the order of a group consisting of the elements of GF(q) denoted as E((GF(q)) is divisible by a prime number of 30 or more digits; and determining an element called a base point P that gives a small absolute number less than 32 bits to at least one of its x-coordinate denoted as x(P) and y-coordinate denoted as y(P), so that fewer parameters represent E, GF(q), P, the order of P to facilitate recovering the base point P.

51. The method of claim 50, wherein the step of supplying the public data includes the steps of:
choosing an elliptic curve E over GF(q) having p elements, where $q=p^1$; and
choosing an element P whose x-coordinate is 0.

52. The method of claim 51, wherein the step of supplying the public data further includes the step of:
choosing p as a prime number satisfies $4*p-1=d*(integer)^2$, so that the elliptic curve having GF(p) as a field of definition will have a j-invariant as a solution modulo p for a class polynomial $H_d(x)=0$ which is determined by d, when d is a positive integer.

53. The method of claim 50, wherein the step of supplying the public data includes the steps of:
choosing an elliptic curve E over GF(p) having p elements, wherein p satisfies $p=3b^2+3b+1$ where b is a positive integer; and
determining the base point by choosing an element P that gives a small number to x(P).

54. The method of claim 50, wherein the step of supplying the public data includes the step of:
choosing a prime number p, wherein p satisfies one of $p=2^t+\alpha$ and $p=2^t-\alpha$, where t is a positive integer and $\alpha$ is a positive integer.

55. The method of claim 50, wherein the step of supplying the public data includes the steps of:
choosing a prime number p, wherein p satisfies one of $p=2^t+\alpha$ and $p=2^t-\alpha$, where t is a positive integer and $\alpha$ is a positive integer; and
choosing an elliptic curve E over (GF(p)) whose E(GF(p)) will have p elements.

56. The method of claim 55, wherein the positive integer $\alpha$ is less than (2t)/3 bits+15 bits long.

57. A method of supplying programs to a plurality of subscribers from a TV program supplier via a public digital network, comprising the following steps:
the TV program supplier noting a subscriber's identification code and sending a smart card to each subscriber, the smart card storing information necessary to decipher enciphered image data, the image data being enciphered using an elliptic curve E, its element P, and a number found by the identification code;
installing the smart card to a TV receiver at each subscriber's end;
a subscriber using his own identification code to send a request to the TV program supplier for a TV program;
enciphering image data of the requested TV program using the elliptic curve E, its element P, and the number found by the identification code upon receipt of the request, and sending resulting enciphered image data to the requesting subscriber via the public digital network by the program supplier; and
deciphering the enciphered image data using the smart card with the TV receiver and displaying resulting deciphered image data as original image data at the subscriber's end,
wherein the step of supplying and the public data includes the steps of:

choosing an elliptic curve E having GF(q) as a field of definition where q is a power of a prime number, and where the order of a group consisting of the elements of GF(q) denoted as E((GF(q)) is divisible by a prime number of 30 or more digits; and determining an element called a base point P that gives a small absolute number less than 32 bits to at least one of its x-coordinate denoted as x(P) and its y-coordinate denoted as y(P), so that fewer parameters represent E, GF(q), P, the order of P to facilitate recovering the base point P.

58. The system of claim 57, wherein the step of supplying the public data includes the steps of:
choosing an elliptic curve E over GF(q) having p elements, where $q=p^l$; and
choosing an element P whose x-coordinate is 0.

59. The system of claim 58, wherein the step of supplying the public data further includes the step of:
choosing p as a prime number that satisfies $4*p-1=d*(integer)^2$, so that the elliptic curve having GF(p) as a field of definition will have a j-invariant as a solution modulo p for a class polynomial $H_d(x)=0$ which is determined by d, where d is a positive integer.

60. The system of claim 57, wherein the step of supplying the public data includes the steps of:
choosing an elliptic curve E over GF(p) having p elements, wherein p satisfies $p=3b^2+3b+1$ where b is a positive integer; and
determining the base point by choosing an element P that gives a small number to x(P).

61. The system of claim 57, wherein the step of supplying the public data includes the step of:
choosing a prime number p, wherein p satisfies one of $p=2^t+\alpha$ and $p=2^t\alpha$, where t is a positive integer and $\alpha$ is a positive integer.

62. The system of claim 57, wherein the step of supplying the public data includes the steps of:
choosing a prime number p, wherein p satisfies one of $p=2^t+\alpha$ and $p=2^t-\alpha$, where t is a positive integer and $\alpha$ is a positive integer; and
choosing an elliptic curve E over (GF(p)) whose E(GF(p)) will have p elements.

63. The system of claim 62, wherein the positive integer $\alpha$ is less than (2t)/3 bits + 15 bits long.

64. A system of supplying programs to a plurality of subscribers from a TV program supplier via a public digital network, comprising the following steps:
the TV program supplier sending a smart card to each subscriber, the smart card storing information necessary to decipher enciphered image data, the image data being enciphered using an elliptic curve E, its element P, and a random number generated by the program supplier using its own identification code;
installing the smart card to a TV receiver at each subscriber's end;
a subscriber using his own identification code to send a request to the TV program supplier for enciphering image data of a TV program using the elliptic curve E, its element P, identification code, and the random number, and transmitting resulting enciphered image data via the public digital network by the TV program supplier;
selecting a channel to receive the TV program from the TV program supplier specified by the identification code by the subscriber; and
deciphering the enciphered image data using the smart card with the TV receiver and displaying resulting deciphered image data as original image data at the subscriber's end,
wherein the step of supplying and the public data includes the steps of:
choosing an elliptic curve E having GF(q) as a field of definition where q is a power of a prime number, and where the order of a group consisting of the elements of GF(q) denoted as E((GF(q)) is divisible by a prime number of 30 or more digits; and
determining an element called a base point P that gives a small absolute number less than 32 bits to at least one of its x-coordinate denoted as x(P) and y-coordinate denoted as y(P), so that fewer parameters represent E, GF(q), P, the order of P to facilitate recovering the base point P.

65. The system of claim 64, wherein the step of supplying the public data includes the steps of:
choosing an elliptic curve E over GF(q) having p elements, where $q=p^l$; and
choosing an element P whose x-coordinate is 0.

66. The system of claim 65, wherein the step of supplying the public data further includes the steps of:
choosing p as a prime number that satisfies $4*p-1=d*(integer)^2$, so that the elliptic curve having GF(p) as a field of definition will have a j-invariant as a solution modulo p for a class polynomial $H_d(X)=0$ which is determined by d, where d is a positive integer.

67. The system of claim 64, wherein the step of supplying the public data includes the steps of:
choosing an elliptic curve E over GF(p) having p elements, wherein p satisfies $p=3b^2+3b+1$ where b is a positive integer; and
determining the base point by choosing an element P that gives a small number to x(P).

68. The system of claim 64, wherein the step of supplying the public data includes the step of:
choosing a prime number p, wherein p satisfies one of $p=2^t+\alpha$ and $p=2^t-\alpha$, where t is a positive integer and $\alpha$ is a positive integer.

69. The system of claim 64, wherein the step of supplying the public data includes the steps of:
choosing a prime number p, wherein p satisfies one of $p=2^t+\alpha$ and $p=2^t-\alpha$, where t is a positive integer and $\alpha$ is a positive integer; and
choosing an elliptic curve E over (GF(p)) whose E(GF(p)) will have p elements.

70. The system of claim 69, wherein the positive integer $\alpha$ is less than (2t)/3 bits + 15 bits long.

* * * * *